(12) United States Patent
Wee

(10) Patent No.: US 10,179,630 B2
(45) Date of Patent: Jan. 15, 2019

(54) FLOATING COMMUNITY

(71) Applicant: Charles I. Wee, Pasadena, CA (US)

(72) Inventor: Charles I. Wee, Pasadena, CA (US)

( * ) Notice: Subject to any disclaimer, the term of this patent is extended or adjusted under 35 U.S.C. 154(b) by 67 days.

(21) Appl. No.: 15/046,382

(22) Filed: Feb. 17, 2016

(65) Prior Publication Data

US 2016/0237705 A1    Aug. 18, 2016

Related U.S. Application Data

(60) Provisional application No. 62/176,421, filed on Feb. 18, 2015.

(51) Int. Cl.
| | | |
|---|---|---|
| *B63B 35/44* | (2006.01) | |
| *E04B 1/343* | (2006.01) | |
| *B63B 35/38* | (2006.01) | |
| *B63B 17/02* | (2006.01) | |
| *B63B 29/02* | (2006.01) | |
| *E04H 9/14* | (2006.01) | |
| *B63B 21/50* | (2006.01) | |

(52) U.S. Cl.
CPC ............. *B63B 35/44* (2013.01); *B63B 17/02* (2013.01); *B63B 29/025* (2013.01); *B63B 35/38* (2013.01); *E04H 9/145* (2013.01); *B63B 21/50* (2013.01); *B63B 2035/4426* (2013.01)

(58) Field of Classification Search
CPC .. E04H 9/14; E04H 9/145; B63B 3/02; B63B 3/08; B63B 17/02; B63B 21/50; B63B 29/025; B63B 35/38; B63B 2035/44; B63B 2035/4426; B63B 35/44
USPC ................................................ 52/79.1, 79.5
See application file for complete search history.

(56) References Cited

U.S. PATENT DOCUMENTS

| | | | | |
|---|---|---|---|---|
| 2,894,290 | A * | 7/1959 | Lundstedt ................. | B60P 3/34 296/173 |
| 3,273,738 | A * | 9/1966 | Blanco ..................... | B65D 9/12 217/12 R |
| 3,581,692 | A | 6/1971 | Mortellito | |
| D222,129 | S | 10/1971 | Blaker | |
| 3,707,811 | A * | 1/1973 | Hampson .................. | E04B 1/10 217/12 R |
| 3,785,314 | A | 1/1974 | Scanlan | |
| 3,791,080 | A * | 2/1974 | Sjoberg ..................... | B63B 3/08 114/266 |
| 3,838,545 | A * | 10/1974 | Kump ................. | E04B 1/34815 52/220.2 |

(Continued)

FOREIGN PATENT DOCUMENTS

| | | |
|---|---|---|
| FR | 2621004 A1 | 3/1989 |
| JP | 02200595 A | 8/1990 |

(Continued)

*Primary Examiner* — Ajay Vasudeva
(74) *Attorney, Agent, or Firm* — Intellectual Property Law Group LLP

(57) ABSTRACT

A sustainable floating community based on a mass-produced modular, pre-fabricated kit of parts referred to as floating modular units. The floating modular units are designed to allow for various needs while remaining simple to deliver and assemble by hand in remote destinations prone to volatile shifts in water levels and currents. The floating modular units are ready to assemble, can be erected for use on land and bodies of water, are easily collapsible for transport, thereby serving as highly adaptable transportable structures.

15 Claims, 42 Drawing Sheets

(56) References Cited

U.S. PATENT DOCUMENTS

| | | | |
|---|---|---|---|
| 3,984,953 A * | 10/1976 | Kump | E04B 1/34321 |
| | | | 220/4.21 |
| 4,228,788 A | 10/1980 | Moeser | |
| 5,347,949 A * | 9/1994 | Winston | B63B 35/44 |
| | | | 114/264 |
| 5,421,282 A * | 6/1995 | Morris | B63B 35/34 |
| | | | 114/264 |
| 5,535,696 A | 7/1996 | Ordinachev | |
| 5,611,449 A * | 3/1997 | Pedersen | B65D 88/522 |
| | | | 220/1.5 |
| 6,773,355 B1 | 8/2004 | Lekhtman | |
| 7,036,449 B2 | 5/2006 | Sutter | |
| 7,775,896 B2 | 8/2010 | Henry et al. | |
| 8,689,718 B2 * | 4/2014 | Cichoski | B63B 21/00 |
| | | | 114/230.15 |
| 9,523,208 B2 * | 12/2016 | Athanasiou | E04H 1/12 |
| 2006/0272240 A1 | 12/2006 | Papageorgiou | |
| 2014/0047781 A1 | 2/2014 | Miller | |

FOREIGN PATENT DOCUMENTS

| | | |
|---|---|---|
| KR | 2013096084 A | 1/2014 |
| WO | WO 02055376 A2 | 7/2002 |
| WO | WO 2005012073 A1 | 2/2005 |
| WO | WO 2015008231 A2 | 1/2015 |

* cited by examiner

FLOATING COMMUNITY

CROSS-REFERENCE TO RELATED APPLICATION

This application claims the benefit of U.S. Provisional Application No. 62/176,421 filed Feb. 18, 2015, which is hereby incorporated by reference in its entirety.

BACKGROUND OF THE INVENTION

1. Field of the Invention

The present invention relates to communities. More particularly, the present invention relates to communities produced from modular, pre-fabricated kits that are easily delivered and assembled and designed for a variety of configurations for water and land.

2. Background

Communities around the world in remote or non-remote locations, live in areas adversely affected by volatile changes in water levels prone to seasonal or frequent flooding as a result of unpredictable extreme water level fluctuations. People living along rivers are faced with having to reside above water for at least eight months out of the year. With only 4 months of dry season with exposed ground, opportunities to raise animals for sustenance are very limited causing cycles of poverty. With frequent flooding, water levels may rise or recede up to 30 feet in the span of a few days. Existing local construction materials and construction technology is very limited increasing time spent making continuous repairs and rebuilding.

These communities currently lack adequate electrical power, sanitation and clean drinking water which adversely affects the population and insures the communities' continual battle with poverty. These existing conditions demonstrate an overwhelming lack of suitable materials and technology to provide long-term protection, safety, comfort and means of becoming economically self-sufficient.

As such, there is a need for a self-contained, floating modular system which can be arranged in a variety of configurations that is easily deliverable and assembled. These modular systems allow people from these communities to have access to a sustainable lifestyle by meeting the various living, working, playing programs that their livelihood depends on when living on or directly adjacent to the water. By creating sustainable floating communities where public utilities are not available and allowing users to have safe housing, the ability to farm, grow livestock, educate, conduct commerce, provide medical procedures and many other life-essential uses, the self-contained, floating modular system is directed toward providing such a technique to insure a more adequate lifestyle and means to accomplish a better way of life. The durable and flexible nature of the invention allows the invention to function on both water and land to best meet the fluctuating water levels and other local site conditions with relative ease.

SUMMARY

According to an embodiment of the present invention, there is transportable structure kit for use in assembling floatable communities in a variety of configurations, comprising: a pair of floatable exterior container shells attachable to each other to form an enclosed transportable container in a transportation mode, the pair of exterior container shells separable as a top portion shell and a bottom portion shell, and at least one exterior side of the bottom portion shell configured for detachably fastening to at least one floating platform; a plurality of column members detachably mounted between the top portion shell and the bottom portion shell in at least four corners of each shell, securing the top portion shell apart from the bottom portion shell in an assembled mode; and a plurality of panel sections detachably mounted between the bottom portion shell and the top portion shell in the assembled mode. The plurality of column members and plurality of panel sections are configured for repetitive assembly and disassembly, and entirely storable within the transportable container in the transportation mode. The structure of the kit in assembled form is floatable. The structure is attachable to each other via one or more floating platforms, such that a floating community is formed.

According to another embodiment of the present invention, there is a transportable structure kit for use in assembling floatable communities in a variety of configurations, comprising: a roof section and a hull section attachable to each other to form an enclosed container in a packed form, each hull section having at least four sides wherein at least one side is removably connectable to at least one independently floatable platform; a plurality of column members detachably mountable between the roof section and the hull section, forming a height of livable space between the roof section and the hull section in an assembled form; a plurality of panel sections detachably mountable between the roof section and the hull section; and a photovoltaic system coupled to the roof section. The column members, panel sections and photovoltaic system are storable inside the enclosed container formed by the roof section and the hull section during the packed form.

According to yet another embodiment of the present invention, there is a method of making a floatable shelter structure from a transportable structure kit, where the kit comprises a pair of exterior container shells attachable to each other to form an enclosed transportable container, the pair of exterior container shells separable as a roof portion and a hull portion, and one or more exterior sides of the hull portion configured for detachably fastening to at least one floating platform; a plurality of detachably mountable column members; and a plurality of detachably mountable panels. The method comprises laying a plurality of platforms adjacent to one another in a hull; connecting at least one first end of a column member to a hull of the shelter structure; connecting at least one second end of a column member to a roof of the shelter structure; connecting at least one floating platform to at least one side of the hull; and connecting at least one panel to a mounting track and fastening the at least one floating platform to at least one exterior side of the hull portion.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
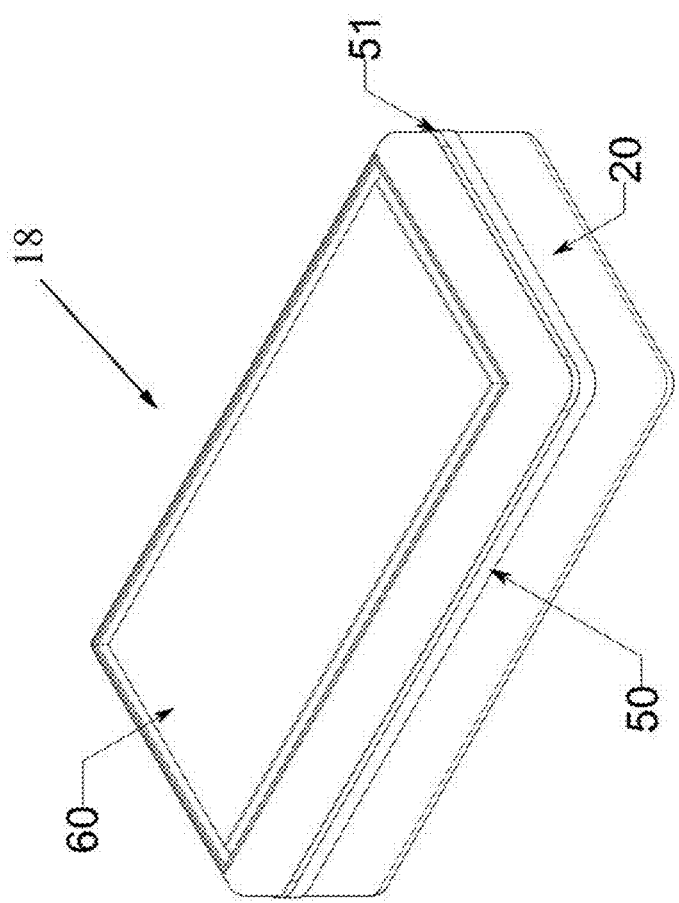
FIG. 1 is a perspective view of a packed floating module unit (FMU) ready for delivery, according to an embodiment of the present invention.

FIG. 1 is a perspective view of a packed floating module unit (FMU) 18 ready for delivery, according to an embodiment of the present invention. FIG. 1 illustrates the compact nature of all the components fitting into the shell of the modular fiberglass mold hull 20 and modular fiberglass mold top cap 60. The overall dimensions of a packed FMU 18 prior to assembly are designed to fit within typical cargo shipping containers and most shipping trucks for ease of transport to final destination. According to an embodiment, the dimension of a packed FMU 18 is approximately 2300 millimeters×4600 millimeters×1130 millimeters. Other dimensions of a packed FMU are contemplated and which can meet cargo shipping container parameters. As the packed FMU 18 is delivered to a site, users can begin to unpack and pull out all components necessary. The modular mounting track 50 and modular mounting corner track 51 are built into the packed FMU 18 and provide a support to attach and secure wall paneling. As shown, the modular mounting tracks 50 and modular mounting corner tracks 51 may be preinstalled on the surrounding exterior perimeter of the mold hull 20 and mold top cap 60. Moreover, in other embodiments, the tracks 50, 51 may instead be packed inside the FMU for subsequent installation onto the hull 20 and top cap 60; or for additional installation to other locations or as replacements pieces. When transporting, the mold top cap 60 and mold hull 20 are secured together by the modular mounting track 50 and the modular mounting corner track 51 with a fastening assembly, for example, a bolt and nut connection.

Figure 2:
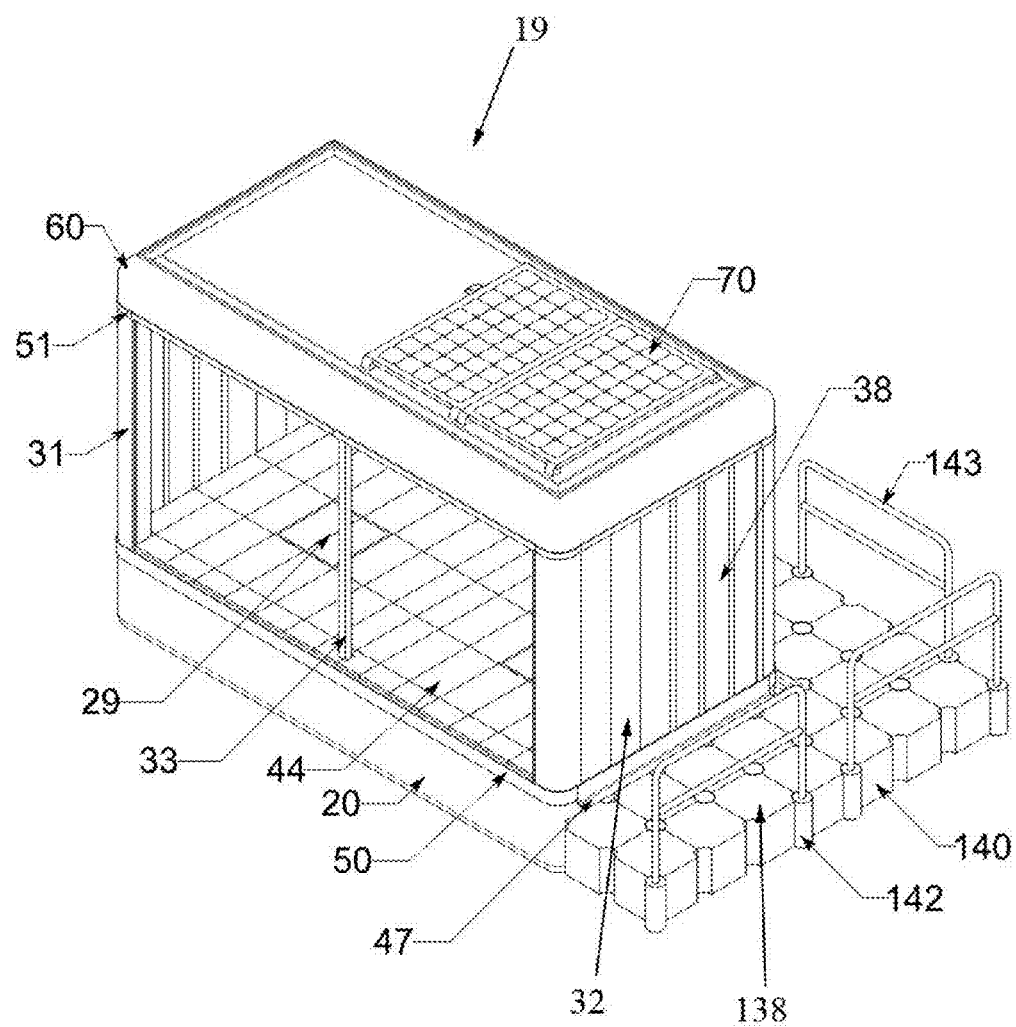
FIG. 2 is a perspective view of a single floating module unit (FMU) with adjacent floating pontoon walkway, according to an embodiment of the present invention.

FIG. 2 is a perspective view of an assembled single floating module unit (FMU) 19 with adjacent high density polyethylene-interlocking floatation pontoon modules (IFPM) walkways 138, according to an embodiment of the present invention. A single FMU 19 can function as a single floating enclosed space, or it can be modified to have open sidewalls. An FMU 19 may be attached to other FMU 19 or high density polyethylene-interlocking floatation pontoon modules (IFPM) 140 with or without waterproof tensile fabric canopies 109 (not shown) or 110 (not shown) to allow for larger enclosed areas. The FMU 19 derives its flotation attributes (floatability) from the modular fiberglass mold hull 20 and the stability of the FMU 19 is enhanced by utilizing commercially available IFPM 140. IFPM 140 is secured to other IFPM 140 by a pontoon connector pin 142. A hinge plate connector 47 securely connects the FMU 19 with the IFPM 140. The FMU 19 can be connected to other FMU 19 in various configurations to create additional surface area to provide better stabilizing properties to help counter water and wave motion. For example, the FMU 19 can be connected directly to another FMU 19 using a similar hinge plate connector 47 (not shown) as that used between an FMU 19 and the IFPM 140. The FMU 19 is also secured by the interlocking guardrails 143 located on the surface of the IFPM 140.

The FMU 19 provides protection from weather conditions by use of an overhead modular fiberglass mold top cap 60 and the tongue and groove wall panel cladding system-long 32 or clear glazing wall panel 38. The FMU 19 design is flexible to accommodate a plurality of wall systems that can be inserted into the modular mounting track 50 and modular mounting corner track 51 and is structured by several fiberglass reinforced plastic structure columns 33. The fiberglass reinforced plastic structure columns 33 have finishing material such as the fiberglass corner mold-outside edge 31. The tongue and groove fiberglass platform flooring 44 is arranged side by side on top of a system of floor beams 43 (not shown), spanning the modular fiberglass mold hull 20. A lower access hatch 29 is integrated into the flooring system to allow direct access to the photovoltaic system battery 22 (not shown), photovoltaic system inverter 23 (not shown) and polyethylene water cistern and purification module 28 (not shown) stored underneath the FMU 19. The FMU 19 as illustrated also integrates the use of integrated photovoltaic panels 70 to help aid in the production of electricity for the intended use of the FMU 19.

Figure 3:
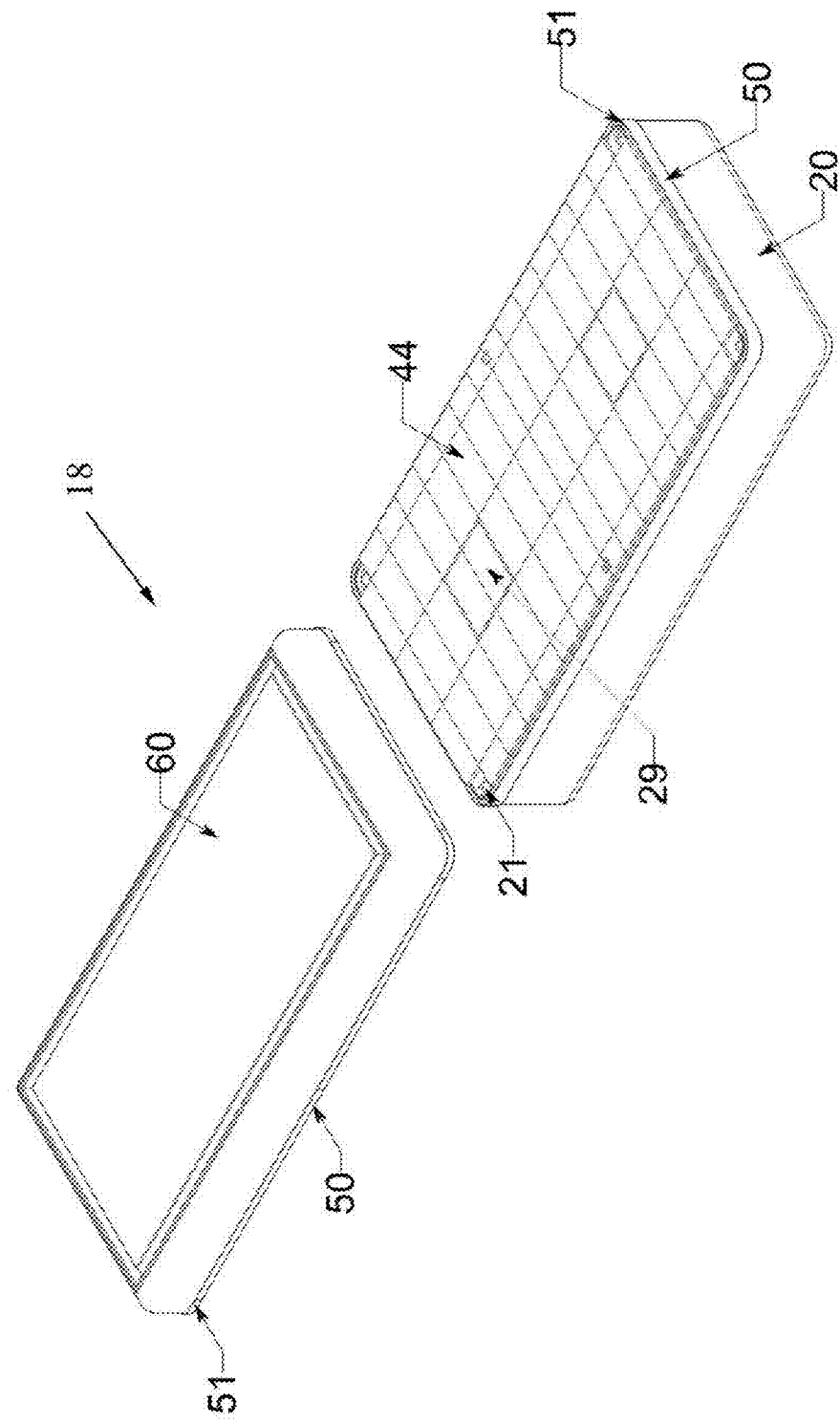
FIG. 3 is a perspective view of an open FMU, according to an embodiment of the present invention.

FIG. 3 is a perspective view of an open packed FMU 18, according to an embodiment of the present invention. The highly durable nature of the modular fiberglass mold hull 20 and modular fiberglass mold top cap 60 when secured together for transport to destination make the system compact and resistant to moisture, insects and rodents. As noted, the mold hull 20 and the mold top cap 60 are secured at its respective modular mounting track 50 and the modular mounting corner track 51, for example by a bolt connection (not shown) (see connection 301 in FIG. 13 as an example connection). A simple assembly process by two persons is needed and no need for tools beyond screwdrivers and a typical ratchet set. All the components fit in the modular fiberglass mold hull 20. Corner column insert sleeve 21 makes it easy for the user to attach fiberglass reinforced plastic-structure column 33 to the modular fiberglass mold hull 20. A corner column insert sleeve 21 may be configured on each of four corners of the hull 20.

Figure 4:
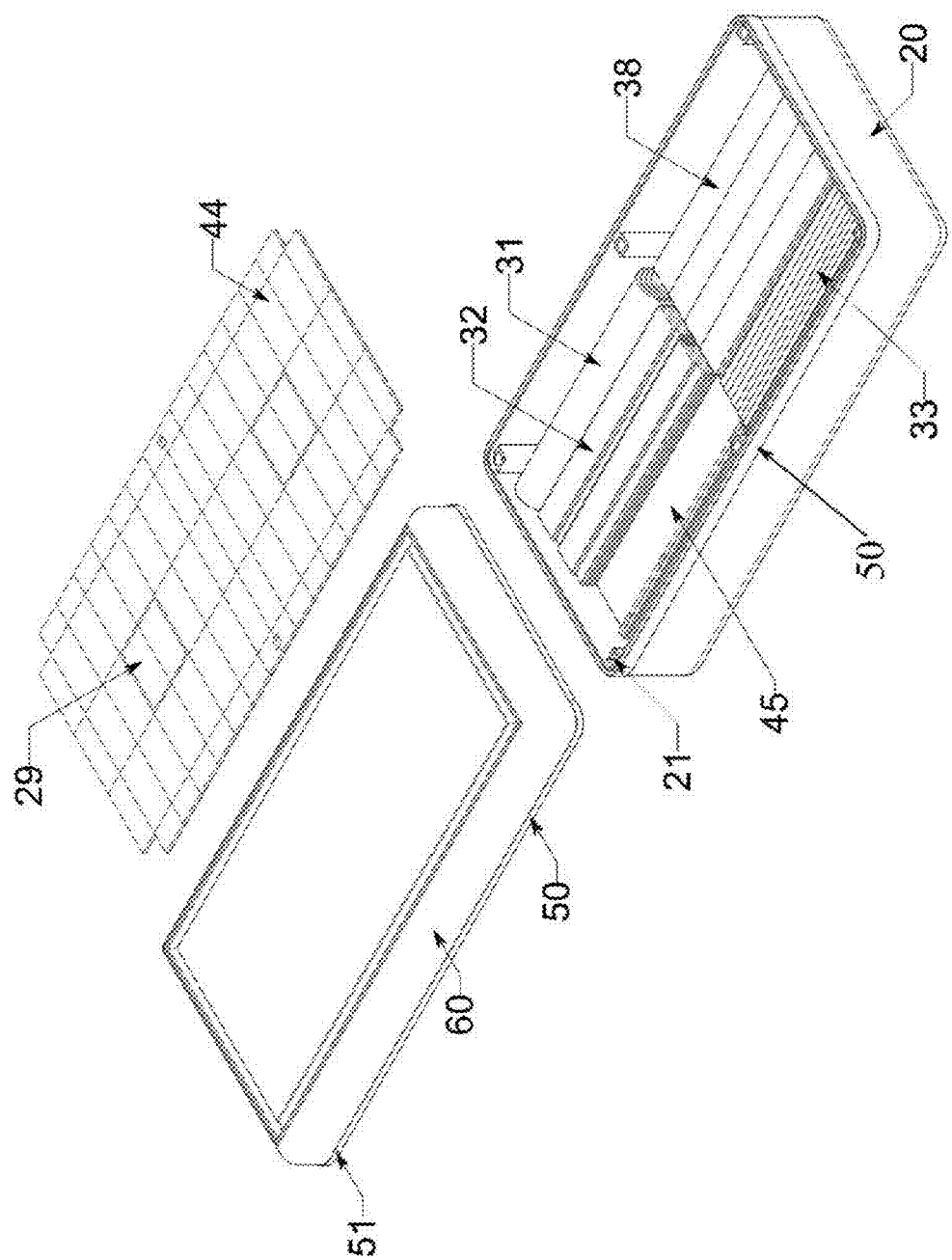
FIG. 4 is a perspective view of an open FMU with partially visible kit of parts contents, according to an embodiment of the present invention.
Figure 5:
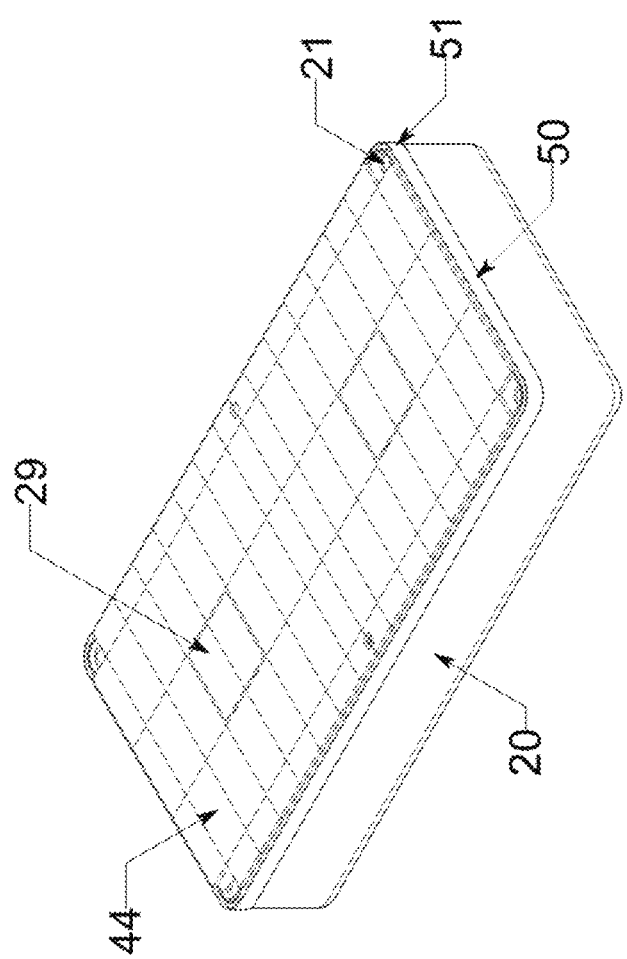
FIG. 5 is a perspective view of one FMU with floor decking in an assembly state, according to an embodiment of the present invention.

FIGS. 4 and 5 are perspective views showing a packed FMU 18 being unpacked-showing partially visible kit of parts contents including the tongue and groove fiberglass platform flooring 44 and integrated lower access hatch 29 that allow users to access crawl space. FIG. 4 further illustrates the door assembly 45 used by the user to enter and exit a FMU 19.

Figure 6:
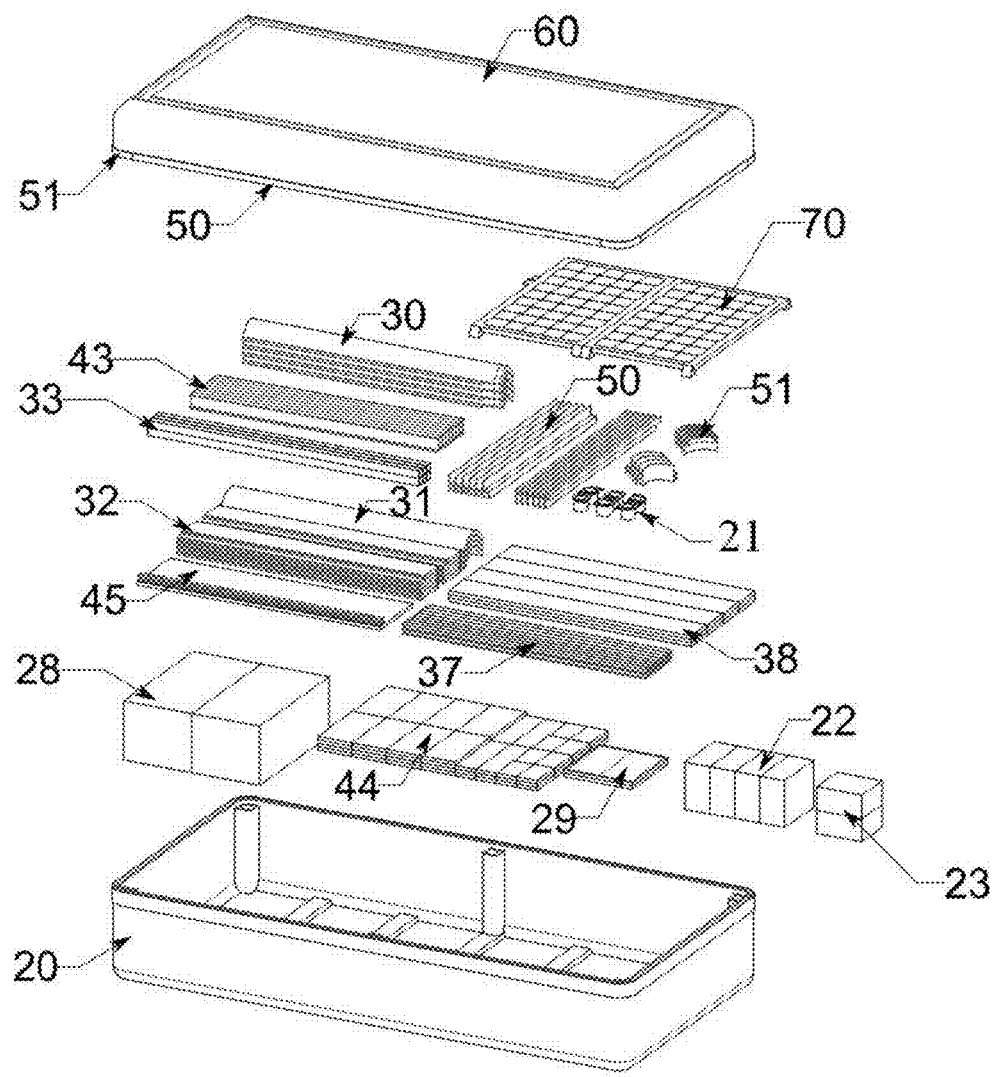
FIG. 6 is an exploded perspective view of the components of a FMU and the packing nature of a FMU, according to an embodiment of the present invention.

FIG. 6 is an exploded perspective view of the components of a packed FMU 18, according to an embodiment of the present invention. All the necessary components fit within the modular fiberglass mold hull 20 and the modular fiberglass mold top cap 60 and these two items can act as a single container for all the FMU 18 contents. The overall size, dimensions and stackable nature of the packed FMU 18 system is designed to fit within existing intermodal freight containers for ease of transport to all destinations via ship, truck or plane. The contents of the packed FMU 18 comprise the photovoltaic system inverter 23, photovoltaic system battery 22, tongue and groove fiberglass platform flooring 44 with lower access hatch 29, wall panel bracket 37, clear glazing wall panel 38, column sleeve insert 21 modular mounting corner track 51, modular mounting track 50, fiberglass corner mold-inside edge 30, fiberglass corner mold-outside edge 31, floor beams 43, fiberglass reinforced plastic structure column 33, tongue and groove wall panel cladding—long 32, door assembly 45, polyethylene water cistern and purification module 28, and integrated photovoltaic panel 70. The modular fiberglass mold top cap 60 and hull 20 are designed with a modular mounting corner track 51 and modular mounting track 50 included, which allows the attachment of various wall systems.

Figure 7:
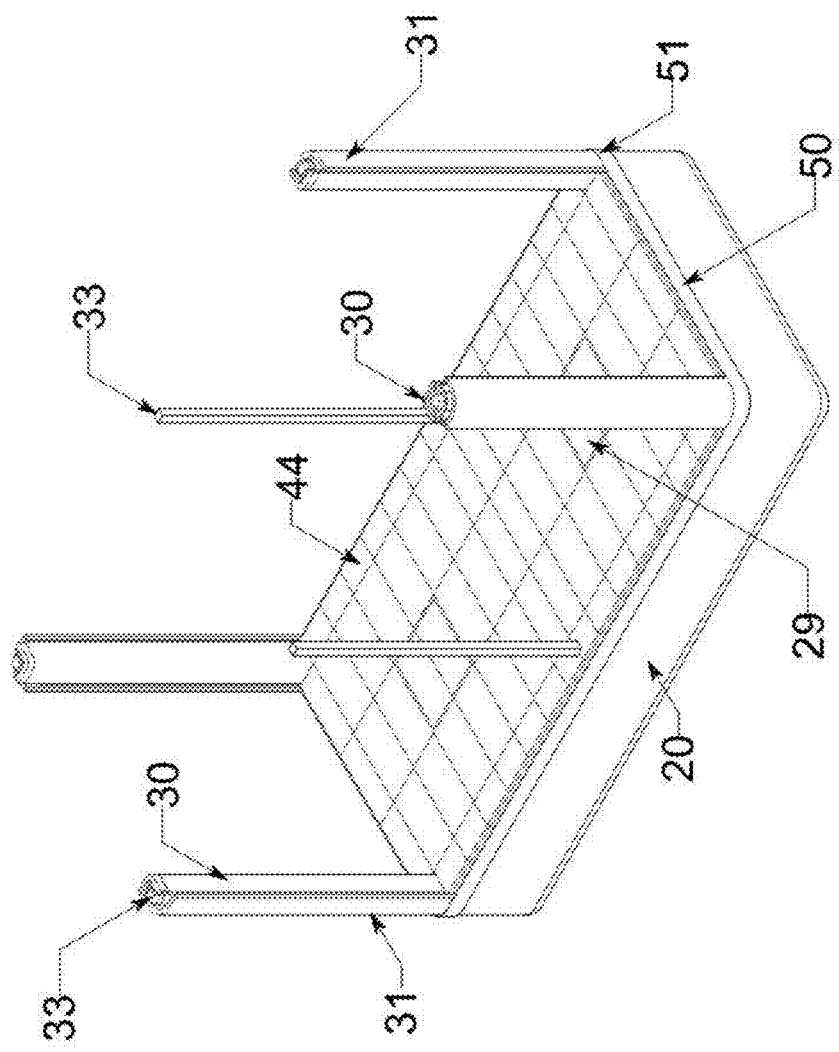
FIG. 7 is a perspective view of one FMU with erected column and corner mold claddings in an assembly state, according to an embodiment of the present invention.

FIG. 7 is a perspective view of one packed FMU 18 with fiberglass reinforced plastic structure column 33 and fiberglass corner mold-inside 30 and fiberglass corner mold-outside 31 in an assembly state, according to an embodiment of the present invention. FIG. 7 illustrates fiberglass reinforced plastic structure column 33 getting inserted into the corner column insert sleeve 21 (not shown) via a cavity connection. Then each fiberglass reinforced plastic structure column 33 is wrapped with a fiberglass corner mold-inside edge 30 and fiberglass corner mold-outside edge 31 that inserts into a modular mounting corner track 51 that is inserted into the modular fiberglass mold hull 20 for additional protection and stability.

Figure 8:
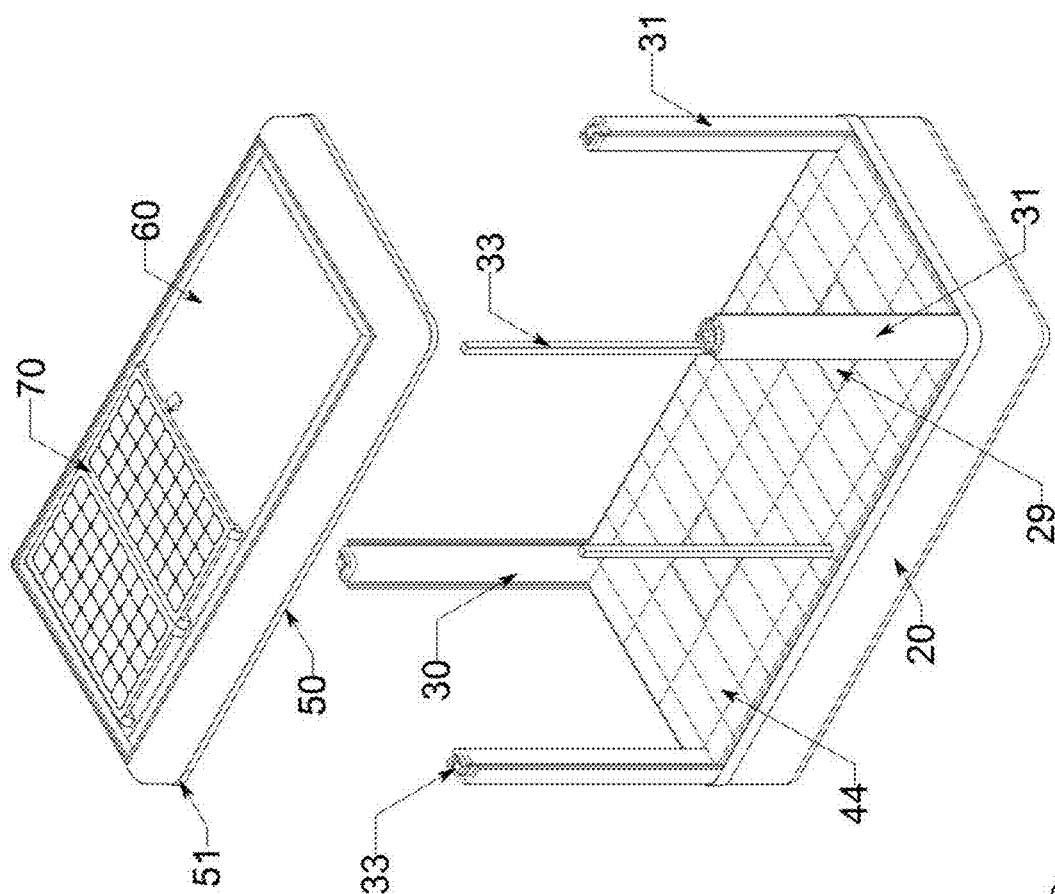
FIG. 8 is a perspective view of one FMU with erected column and corner mold cladding, modular fiberglass mold top cap and integrated photovoltaic panel in an assembly state, according to an embodiment of the present invention.

FIG. 8 illustrates a roof is provided to the FMU 19 by attaching the modular fiberglass mold top cap 60 with the modular mounting track 50 and modular mounting corner track 51 to the fiberglass reinforced plastic structure column 33 and fiberglass corner mold-inside edge 30 and fiberglass corner mold-outside edge 31.

Figure 9:
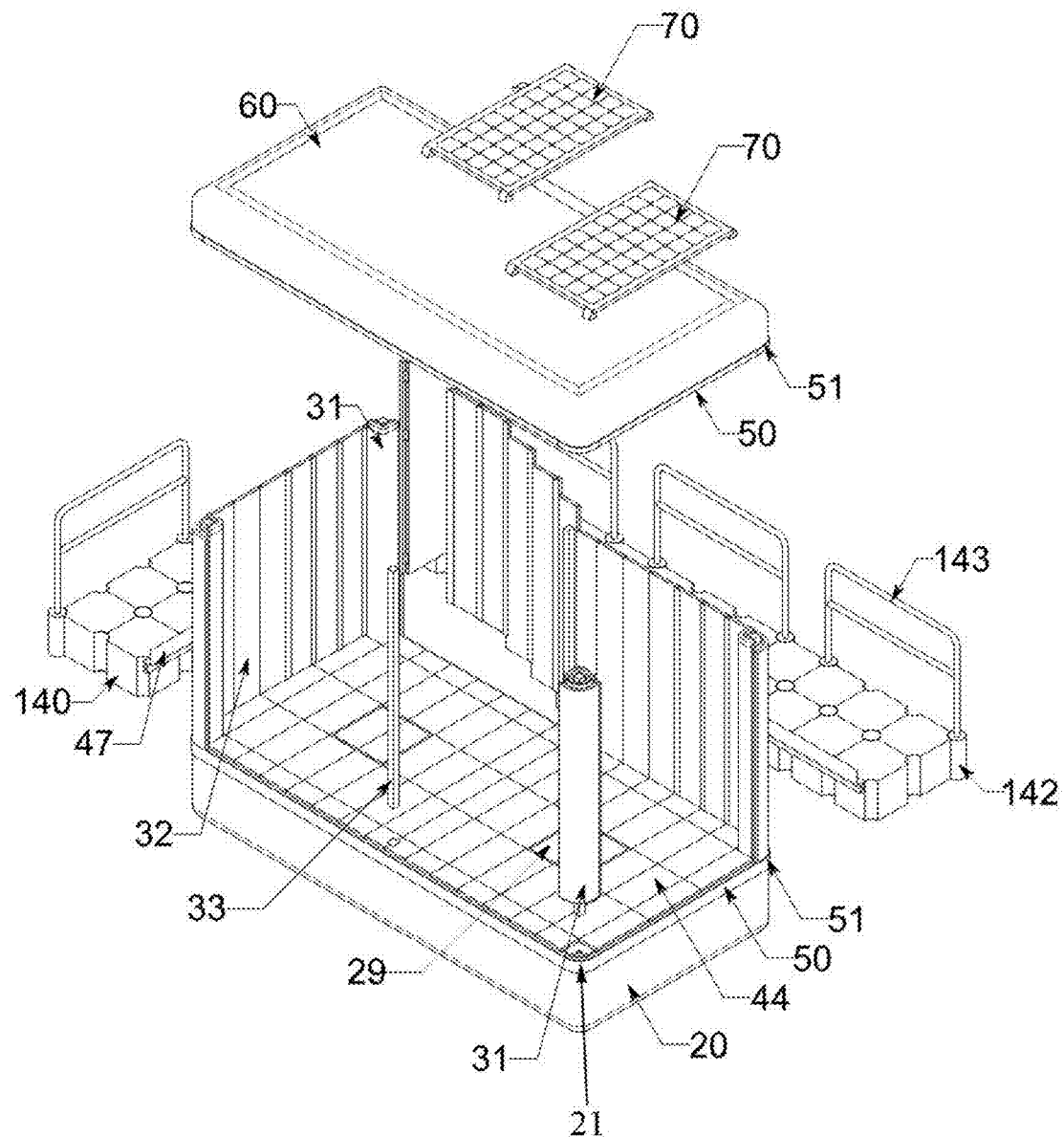
FIG. 9 is an exploded perspective view of the assembly nature of a FMU and its components, according to an embodiment of the present invention.

FIG. 9 is an exploded perspective view of the assembly nature of a FMU 19 and its components, according to an embodiment of the present invention. The lower portion of the FMU 19 is comprised of the modular fiberglass mold hull 20 which acts much like a hull for a boat. The tongue and groove fiberglass platform flooring 44 comprises a lower access hatch 29 which allows users to access the storage space below and access to the photovoltaic system battery 22 (not shown), photovoltaic system inverter 23 (not shown), polyethylene water cistern (not shown) and purification module 28 (not shown). This pre-fabricated tongue and groove fiberglass flooring will serve as the walking surface for users and is highly durable and well suited for marine environments.

The FMU walls are erected by placing fiberglass reinforced plastic structure columns 33 directly into the corner column insert sleeves 21 within the modular fiberglass mold hull 20. Once these columns are erected, tongue and groove wall panel cladding—long 32 and fiberglass corner mold-outside edge 31 are inserted into modular mounting track 50 and modular mounting corner track 51 along the modular fiberglass mold hull 20 and modular fiberglass mold top cap 60 and held together in an interlocking nature for stability. The modular fiberglass mold hull 20 and modular fiberglass mold top cap 60 work together to lock the wall assembly and system together without the need for additional fasteners and the entire system can be erected with as little as two people. The perimeter edge of the FMU 19 is designed to accommodate commercially available IFPM 140 systems and is directly connected to the FMU by a hinge plate connector 47 that allows the FMU 19 and IFPM 140 to be securely connected while allowing acceptable range of motion to counteract water motion and wave fluctuations. Pontoon connector pins 142 connect the IFPM 140 to other IFPM 140.

Figure 10:
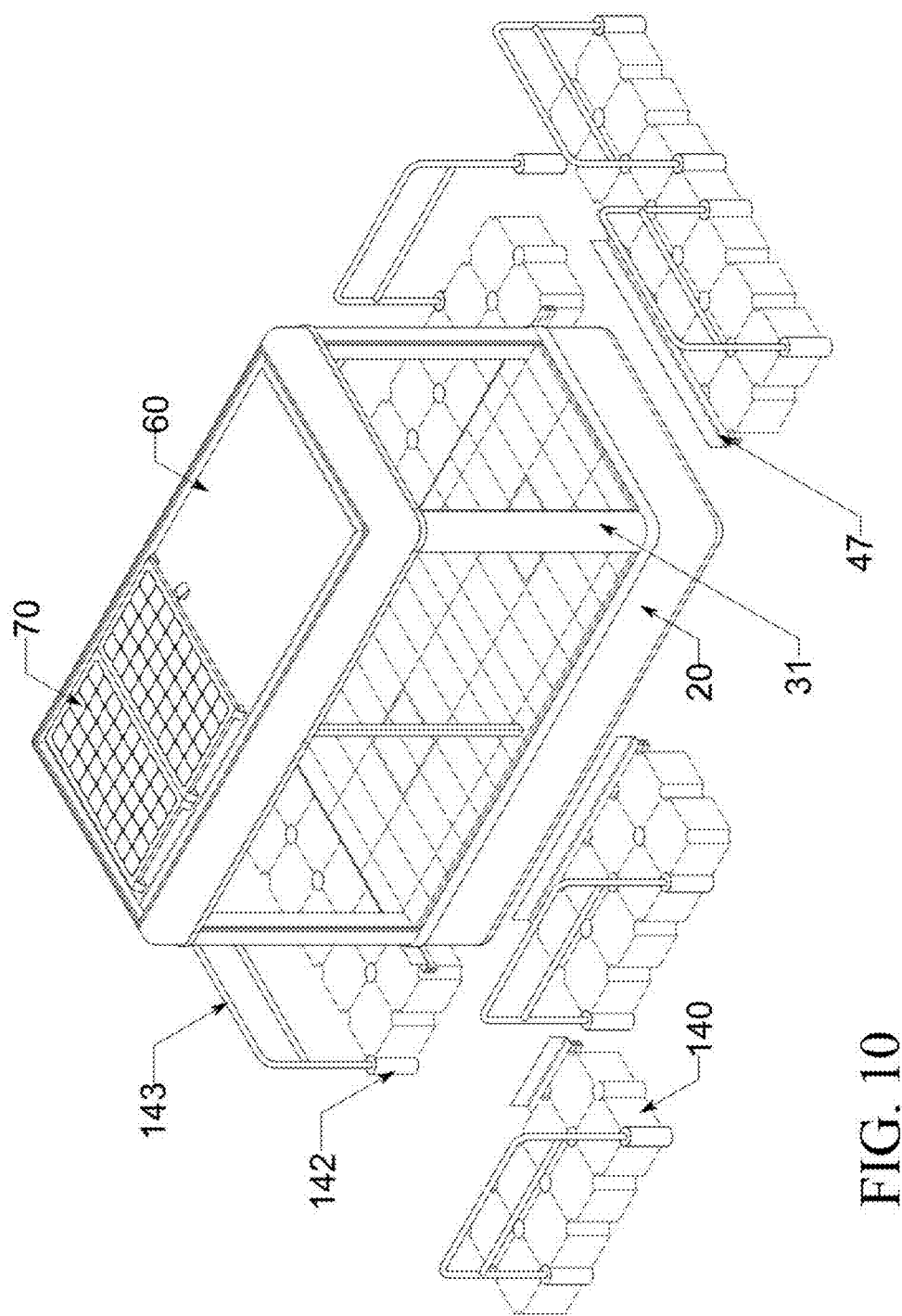
FIG. 10 is a perspective view of one FMU with erected column and corner mold cladding, modular fiberglass mold top cap with integrated photovoltaic panel, floating pontoons and interlocking guardrails, according to an embodiment of the present invention.

FIG. 10 illustrates IFPM 140 attached to the outer edge of the FMU 19 and bolted to the perimeter edge of the modular fiberglass mold hull 20 by means of a hinge plate connector 47. The use of a hinge plate connector 47 allows users to quickly attach or detach adjacent FMU 19 as needed while providing necessary range of motion between FMU 19 to counteract the typical wave and kinetic water motion. The perimeter edges of the IFPM 140 that are not attached to FMU 19 can include an interlocking guardrail 143 for user safety.

Figure 11:
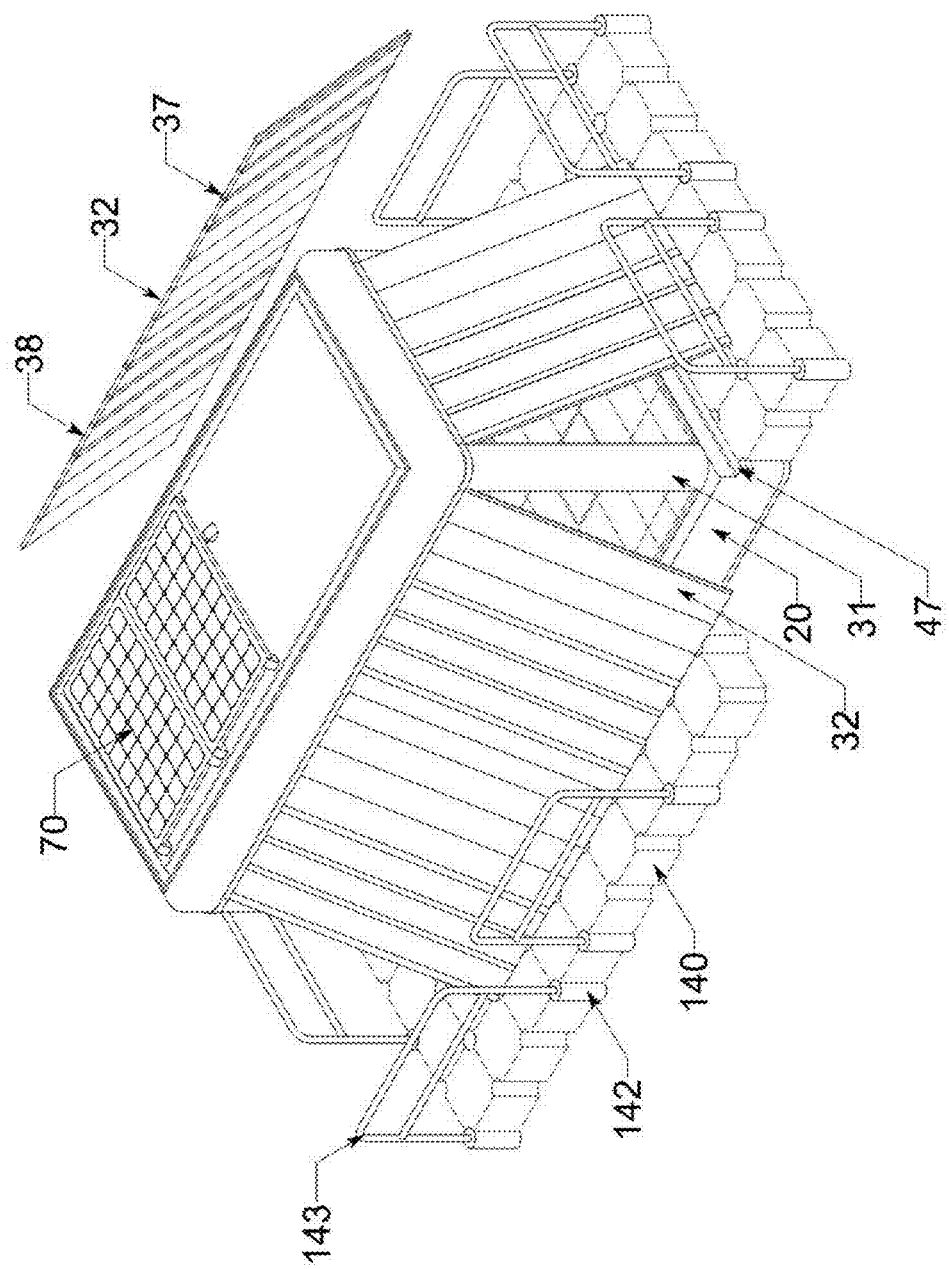
FIG. 11 is a perspective view of one FMU with erected column and corner mold cladding, modular fiberglass mold top cap with integrated photovoltaic panel, floating pontoons, interlocking guardrails and groove wall panel cladding, according to an embodiment of the present invention.
Figure 12:
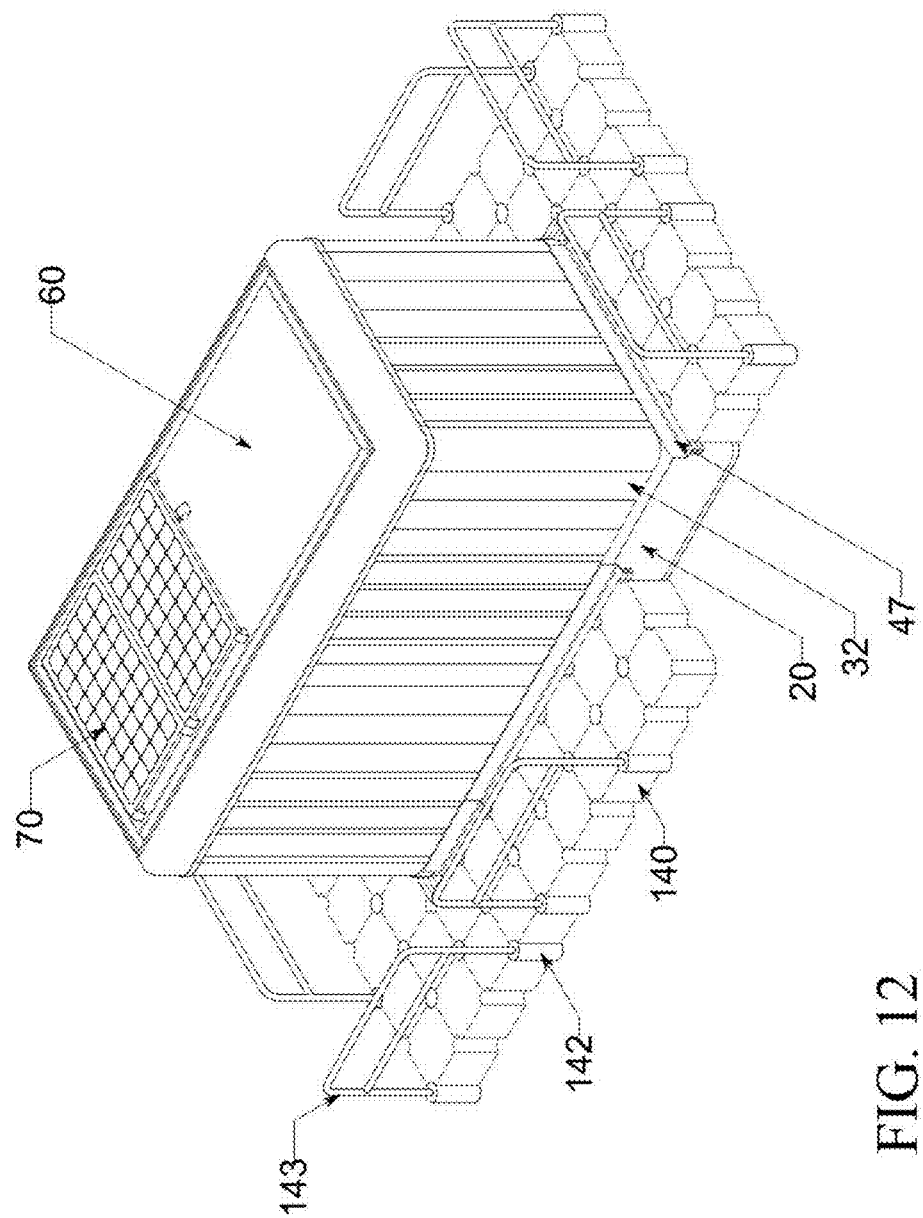
FIG. 12 is a perspective view showing a fully assembled FMU configuration, according to an embodiment of the present invention.

FIGS. 11 and 12 illustrates assembling the wall system for an enclosed FMU 19. Tongue and groove wall panel cladding-long 32 composed of durable fiberglass are tilted and easily inserted and locked into place by the modular mounting track 50. The tongue and groove mechanism of each wall panel allows panels to connect and lock-into place with each other as well. The interlocking mechanism of both the modular mounting track 50 and tongue and groove connection type of the wall panels allows for a durable, rigid wall system requiring no additional bolts or fasteners. In instances where additional natural light is desired, a clear glazing panel system 38 can be substituted for the tongue and groove wall panel cladding-long 32. A fully enclosed FMU 19 with integrated photovoltaic panels 70 used for a plurality of uses is constructed when all the paneling is in place. The flexible nature allows for FMU 19 to be assembled and arranged in a multitude of configurations.

Figure 13:
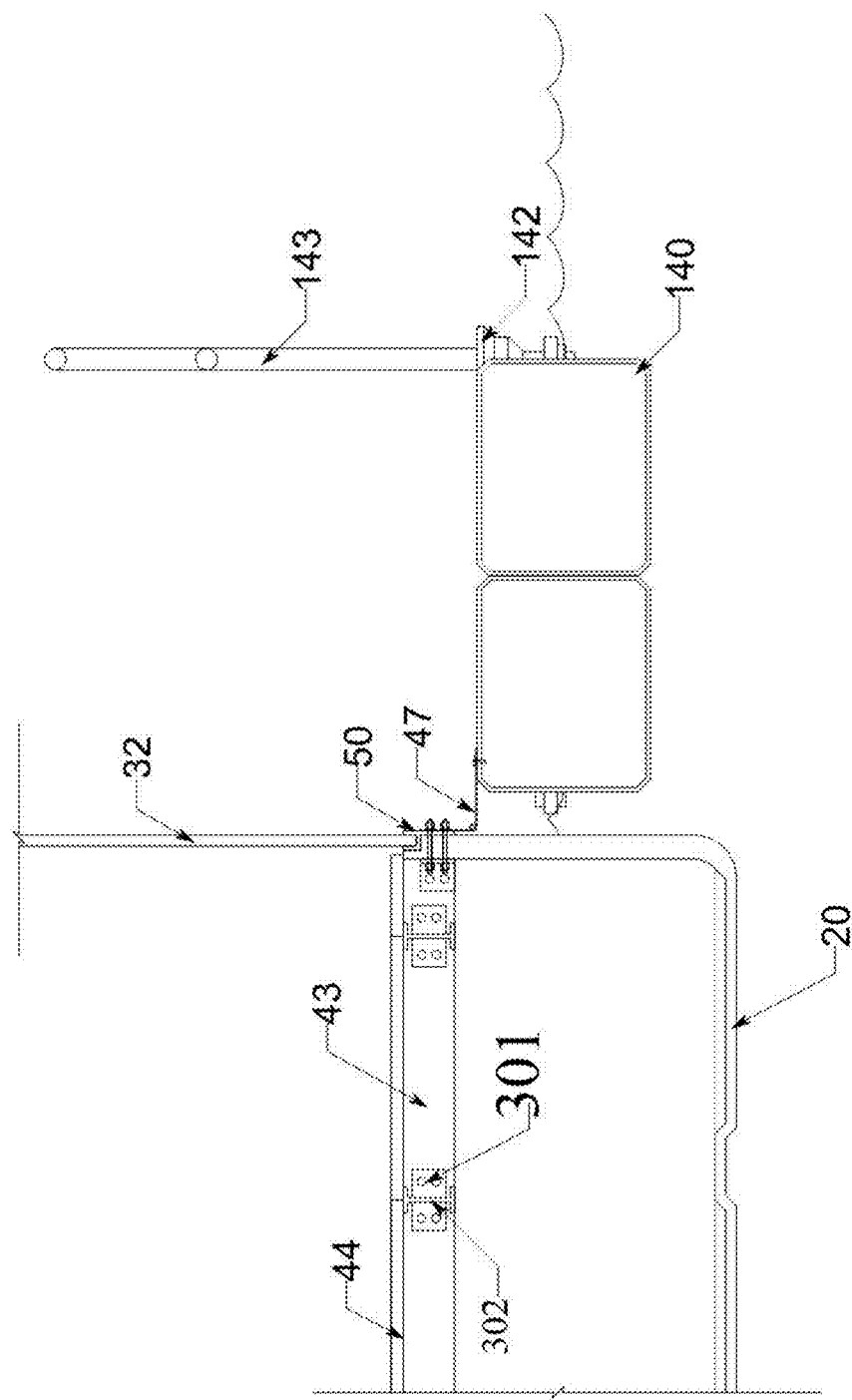
FIG. 13 is a detail sectional view of connection details between FMU and floating pontoon assembly, according to an embodiment of the present invention.

FIG. 13 is a detail sectional view of connection details between FMU 19 and IFPM 140, according to an embodiment of the present invention. FIG. 13 illustrates the floor beams 43 attaching to the modular fiberglass mold hull 20 by an angle bracket 302 and stainless steel bolt, washer, and nut assembly 301. Above the floor beam 43, rests the tongue and groove fiberglass platform flooring 44. The perimeter edge of the IFPM 140 not attached to an FMU 19 can have protective fence guardrail 36 (not shown) to provide additional security for users.

Figure 14:
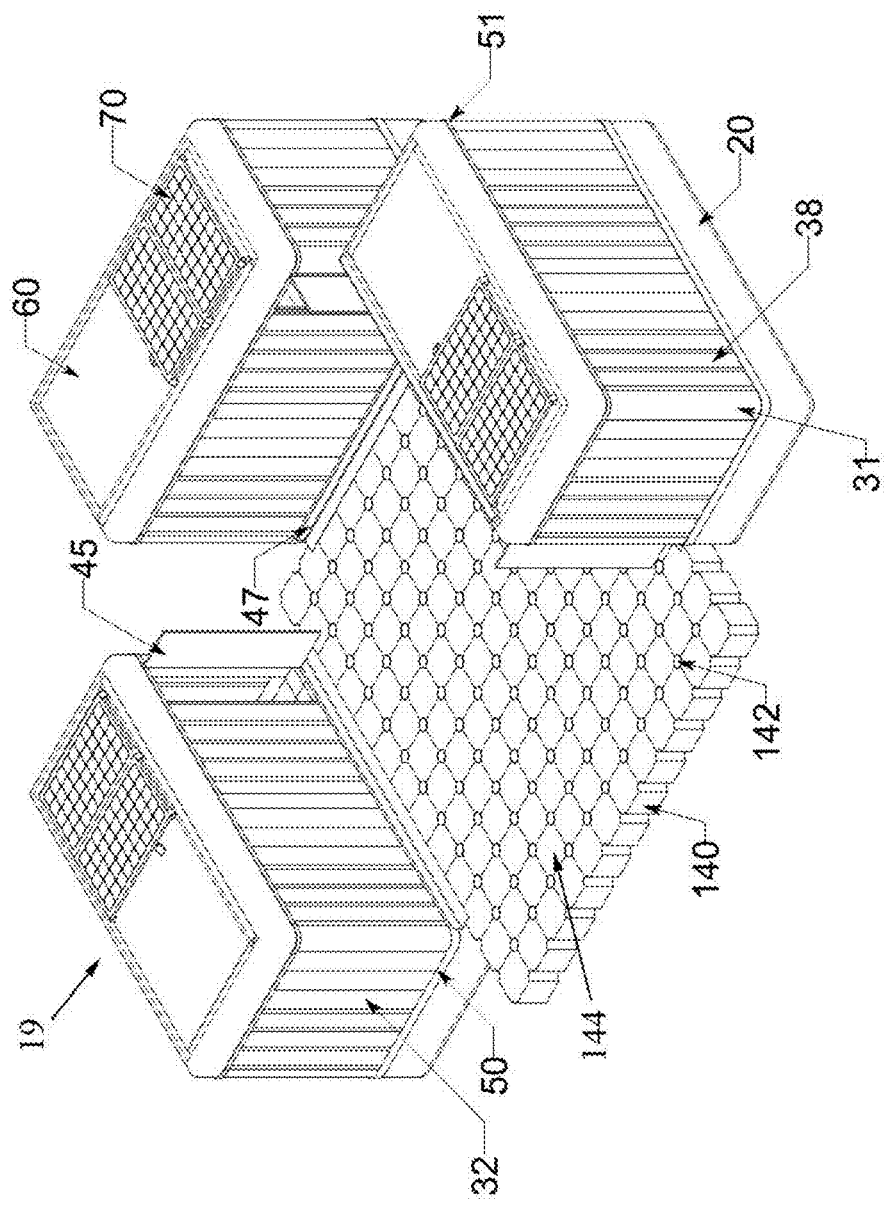
FIG. 14 is a perspective view of three FMU attached to a floating pontoon plaza to create a larger assembly, according to an embodiment of the present invention.

FIG. 14 is a perspective view of three FMU 19 attached to a floating pontoon plaza 144 to create a larger assembly, according to an embodiment of the present invention. As shown, the three FMU 19 are connected to IFPM 140 using a hinge plate connector 47. A plurality of IFPM 140 connected together using pontoon connector pin 142 create the pontoon plaza 144, which acts as a large central courtyard and can accommodate larger program uses while also providing additional stability to the overall assembly. The FMU 19 can be connected directly to another FMU 19 using a hinge plate connector 47 (not shown).

Figure 15:
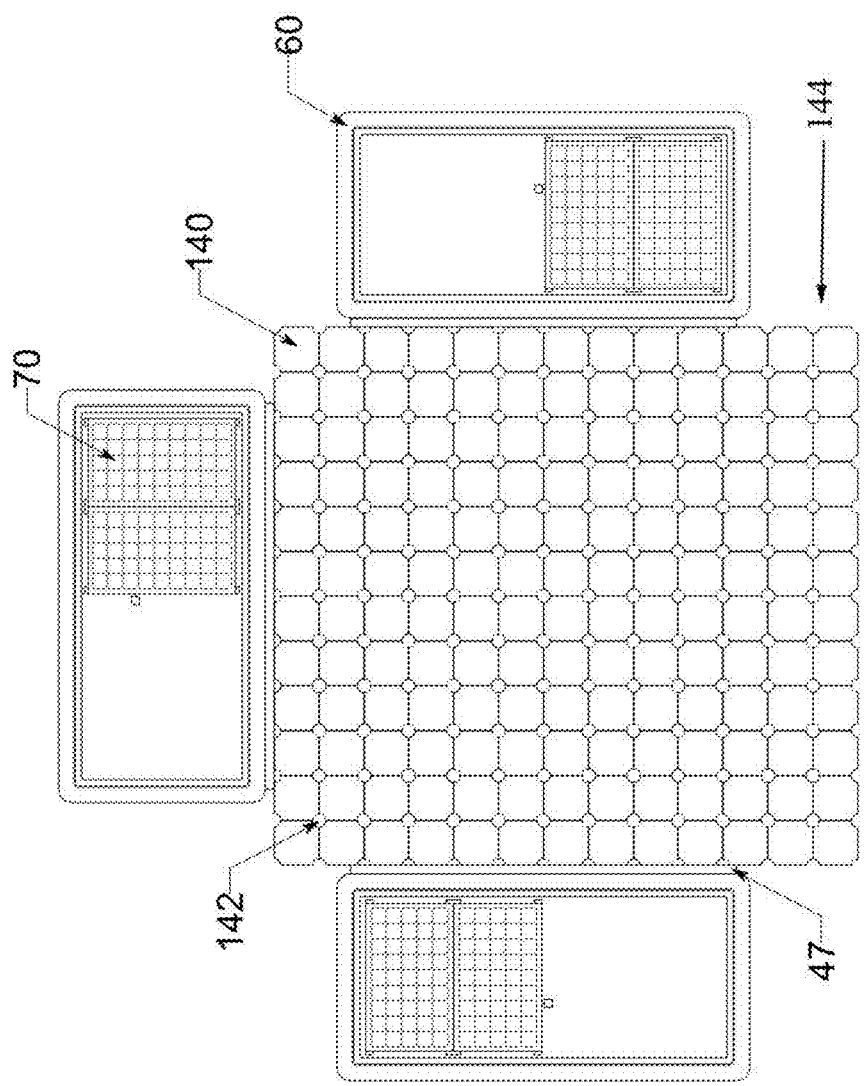
FIG. 15 is a top plan view of three FMU attached to a floating pontoon plaza to create a larger assembly of an open air floating pontoon plaza, according to an embodiment of the present invention.

FIG. 15 is a top plan view of three FMU 19 attached to a floating pontoon plaza 144 to create a larger assembly of an open air floating pontoon plaza 144, according to an embodiment of the present invention. Each FMU 19 is attached to a central courtyard of IFPM 140 by means of a hinge plate connector 47 that is bolted to the modular fiberglass mold hull 20 and IFPM 140. Each modular fiberglass mold top cap 60 provides a system of integrated photovoltaic panels 70 to assist in the generation of power for the FMU 19. The pontoon connector pin 142 connects the IFPM 140 to one another.

Figure 16:
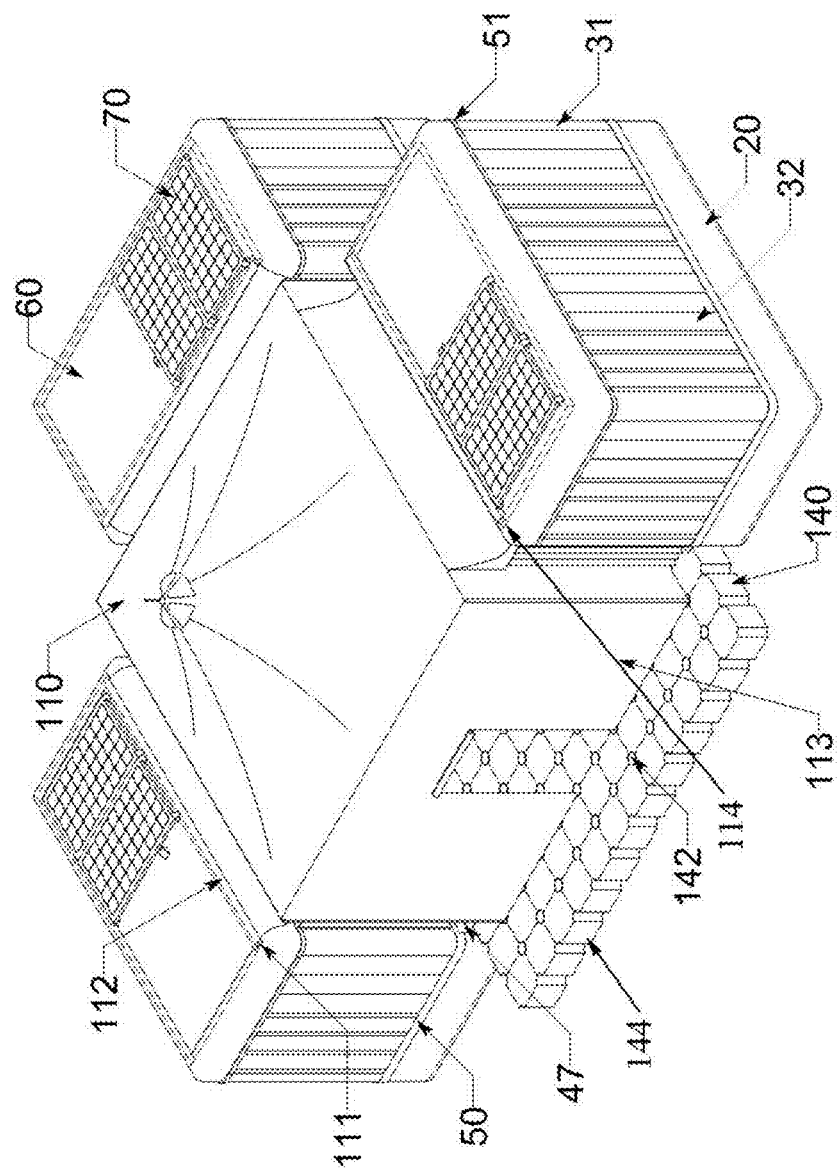
FIG. 16 is a perspective view of three FMU attached to a floating pontoon plaza covered with an erect waterproof tensile fabric canopy, according to an embodiment of the present invention.

FIG. 16 is a perspective view of three FMU 19 attached to a floating pontoon plaza 144 covered with an erect waterproof tensile fabric canopy 110, according to an embodiment of the present invention. The addition of a waterproof tensile fabric canopy 110 covers the pontoon plaza 144 and comprises a waterproof fabric sidewall with zipper 113. The waterproof tensile fabric canopy 110 attaches directly to the FMU 19 by wrapping around a fiberglass pipe 111 and inserting into a pre-molded gap 114 or channel in the modular fiberglass mold top cap 60. The fiberglass pipe 111 or tube is secured to the pre-molded gap 114 with a mold fabric bracket 112 located on the top outer edge of the modular fiberglass mold top cap 60. In other methods, the fabric canopy 110 may have an edge sewn or otherwise fastened upon itself to form a cavity, through which the pipe 111 is fed through, and subsequently inserted into the gap 114. The waterproof tensile fabric canopy—translucent 110 can be used or not used depending on the user preference at that time. The fiberglass corner mold-outside edge 31 inserts into a modular mounting corner track 51 which is further inserted into the modular fiberglass mold hull 20 and modular fiberglass mold top cap 60 for additional protection and stability.

Figure 17:
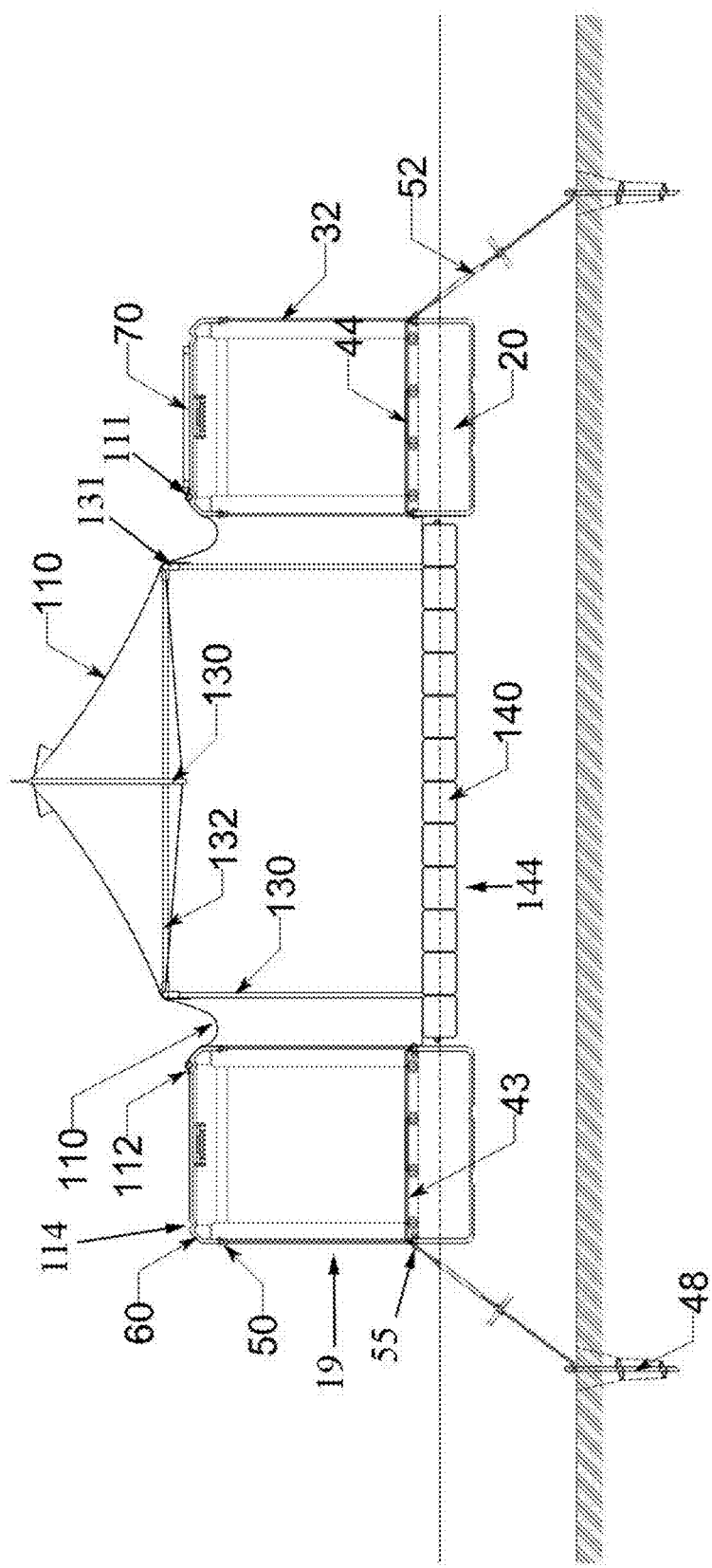
FIG. 17 is a sectional view thru a three FMU and floating pontoon assembly with erected tensile fabric canopy, according to an embodiment of the present invention.

FIG. 17 is a sectional view thru a three FMU 19 and floating pontoon plaza 144 with a waterproof tensile fabric canopy—translucent 110, according to an embodiment of the present invention. The illustration shows waterproof tensile fabric canopy—translucent 110 elevated by the vertical canopy structural membrane 130 and the FMU 19 connected to the two adjacent FMU 19. The complete assembly is able to stay in place on the water by means of an underwater restraint system comprising an elastic rode 52, which is connected to the steel U-bracket connector 55 attached to the modular fiberglass mold hull 20 at one end and to the helix anchor assembly 48 at the other end. The helix anchor assembly 48 anchors into the earth and prevents the FMU 19 from floating away. When the level of the water rises, the elastic rode 52 stretches allowing the FMU 19 and pontoon plaza 144 to rise along with the water level without getting detached from the earth. When the level of the water decreases, the elastic rode 52 contracts allowing the FMU 19 and pontoon plaza 144 to descend along with the water level without getting detached from the earth.

FIG. 17 further illustrates the floor beam 43 below the tongue and groove fiberglass platform flooring 44. The waterproof tensile fabric canopy-translucent 110 is supported by vertical canopy structural members 130 connected to horizontal canopy structural members 132 by a canopy structural elbow connector 131. The waterproof tensile fabric canopy-translucent 110 is connected to the FMU 19 by being wrapped around a fiberglass pipe 111 and being secured to a pre-molded gap 114 secured by a fiberglass top mold fabric bracket 112.

FIG. 17 further illustrates an integrated photovoltaic panel 70 on top of a modular fiberglass mold top cap 60 and a plurality of IFPM 140 adjacent to one another to create a pontoon plaza 144.

Figure 18:
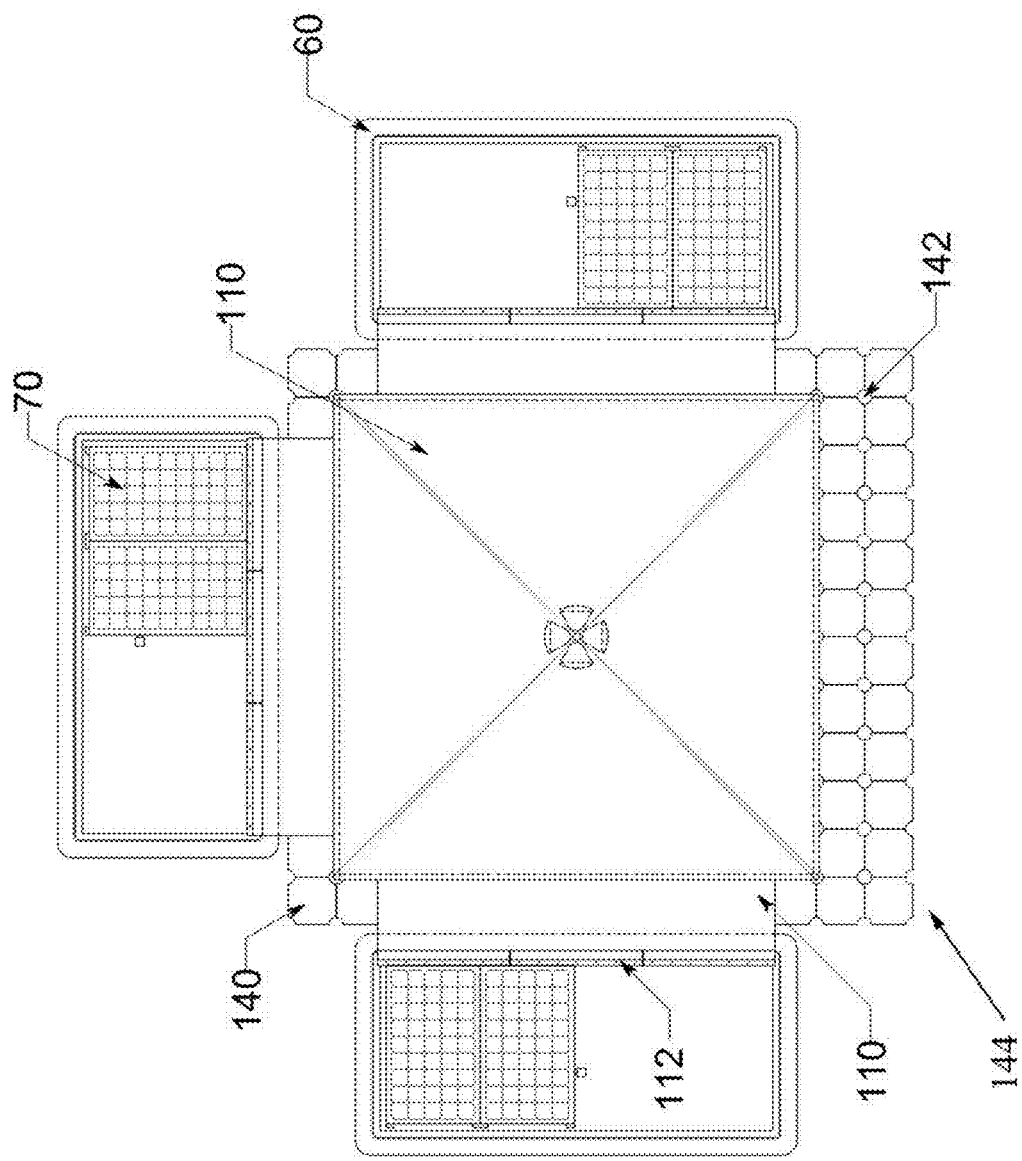
FIG. 18 is a top plan view of the three FMU attached to a floating pontoon plaza covered with an erect waterproof tensile fabric canopy, according to an embodiment of the present invention.

FIG. 18 is a top plan view of the three FMU 19 attached to a floating pontoon plaza 144 covered with an erect waterproof tensile fabric canopy-translucent 110, according to an embodiment of the present invention. The addition of a waterproof tensile fabric canopy—translucent 110 covers the pontoon plaza 144 and attaches directly to the FMU 19 by a fiberglass pipe 111 wrapping around the canopy fabric and inserting this pipe into a pre-molded gap 114 (not shown) in the modular fiberglass mold top cap 60. This is firmly secured by placing a fiberglass top mold fabric bracket 112 over this assembly and fastening directly to the modular fiberglass mold top cap 60 to keep the canopy firmly secured to the FMU 19 while providing protection from sun and rain.

Figure 19:
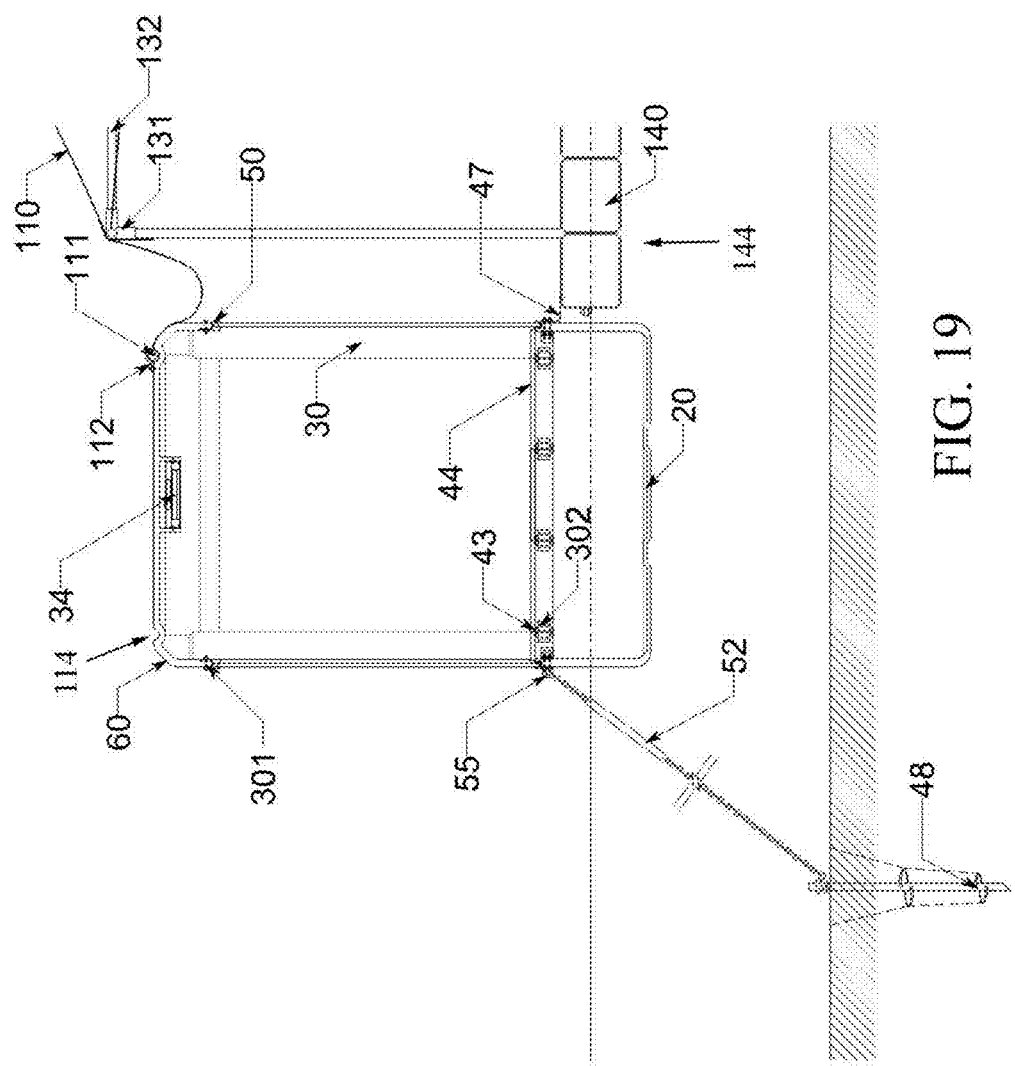
FIG. 19 is a sectional view thru a FMU and floating pontoon assembly, according to an embodiment of the present invention.

FIG. 19 is a detailed sectional view thru a FMU 19 and floating pontoon plaza 144, according to an embodiment of the present invention. FIG. 19 illustrates a hinge plate connector 47 connecting the IFPM 140 to the modular fiberglass mold hull 20 of the FMU 19. The tongue and groove fiberglass platform flooring 44 is held in place by the structural floor beams 43 spanning the modular fiberglass mold hull 20 and angle brackets 302. The roof is assembled by connecting the modular mounting track 50 using stainless steel bolt, washer and nut assembly 301 onto the modular fiberglass mold top cap 60. The roof comprises built-in ventilation pockets 34 that allow air to penetrate while preventing water from entering.

The pontoon plaza 144 can have additional roof coverage using the waterproof tensile fabric canopy—translucent 110 that rolls around a fiberglass pipe 111, while resting in a pre-molded gap 114 of the modular fiberglass mold top cap 60 and anchored above by a fiberglass top mold fabric bracket 112.

FIG. 19 further illustrates the underwater restraint system comprising the elastic rode 52 connected to a steel U-bracket connector 55 and helix anchor assembly 48 and fiberglass corner mold-inside edge 30 for finishing the fiberglass reinforced plastic structure columns 33.

Figure 20:
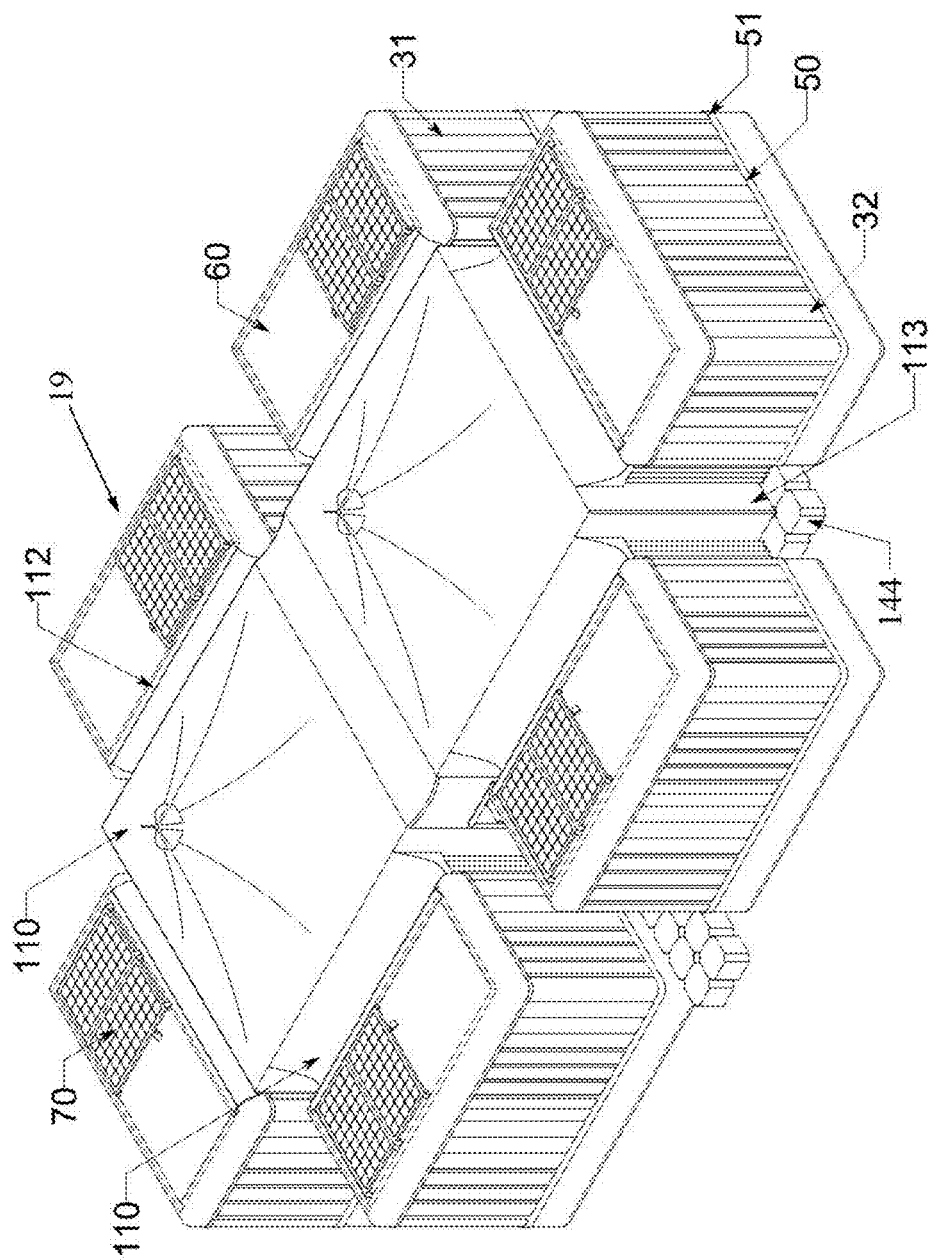
FIG. 20 is a perspective view of six FMU and floating pontoon assembly with two erected tensile fabric canopies conjoined to create a larger water-proof composition, according to an embodiment of the present invention.

FIG. 20 is a perspective view of six FMU 19 and floating pontoon plaza 144 with two erected waterproof tensile fabric canopy-translucent 110 conjoined to create a larger waterproof composition, according to an embodiment of the present invention. FIG. 20 illustrates two configurations displayed in FIG. 16 connected together by pontoon connector pin 142 (not shown) to create a larger pontoon plaza 144 that can be utilized for a plurality of uses including but not limited to housing, education, clinic, storage, assembly, church, and retail. The waterproof fabric sidewall with zipper 113 allows the user access to areas under the waterproof tensile fabric canopy-translucent 110 and FMU 19 without having to be exposed to the elements. The wall of the FMU 19 comprises tongue and groove wall panel cladding-long 32 removably connected to the modular mounting track 50 and modular mounting corner track 51. FIG. 20 further illustrates a perspective view of the fiberglass top mold fabric bracket 112 securing the waterproof tensile fabric canopy-translucent 110 to the FMU 19 and integrated photovoltaic panel 70 secured to a modular fiberglass mold top cap 60.

Figure 21:
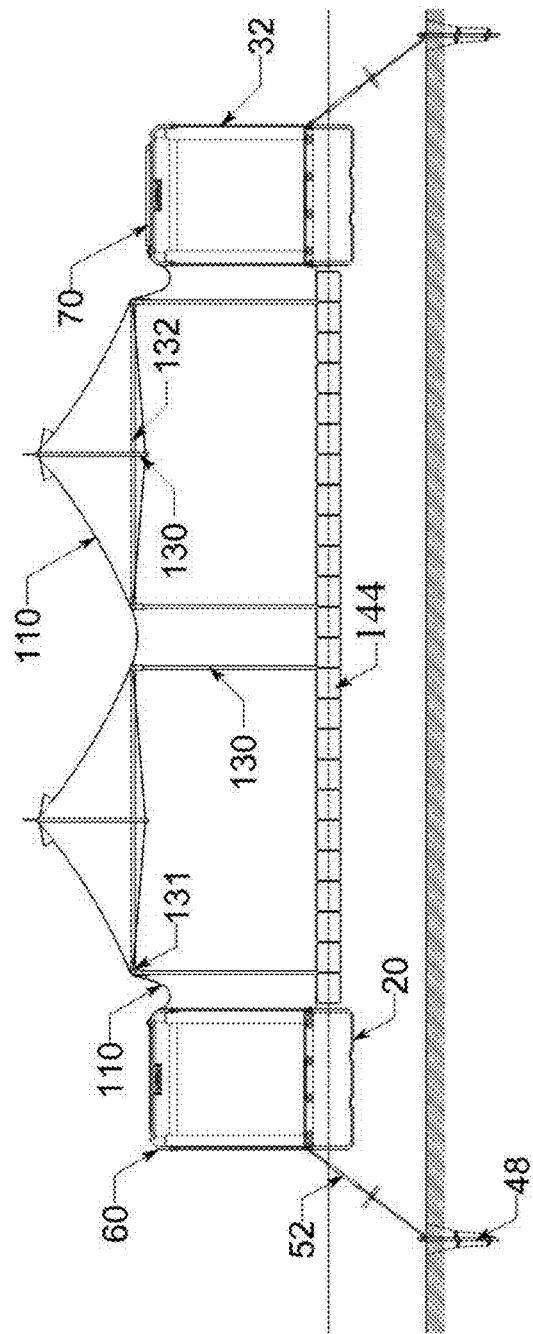
FIG. 21 is a sectional view thru six FMU and floating pontoon assembly with erected tensile fabric canopy, according to an embodiment of the present invention.

FIG. 21 is a sectional view thru six FMU 19 and floating pontoon plaza 144 with an erected waterproof tensile fabric canopy-translucent 110, according to an embodiment of the present invention.

Figure 22:
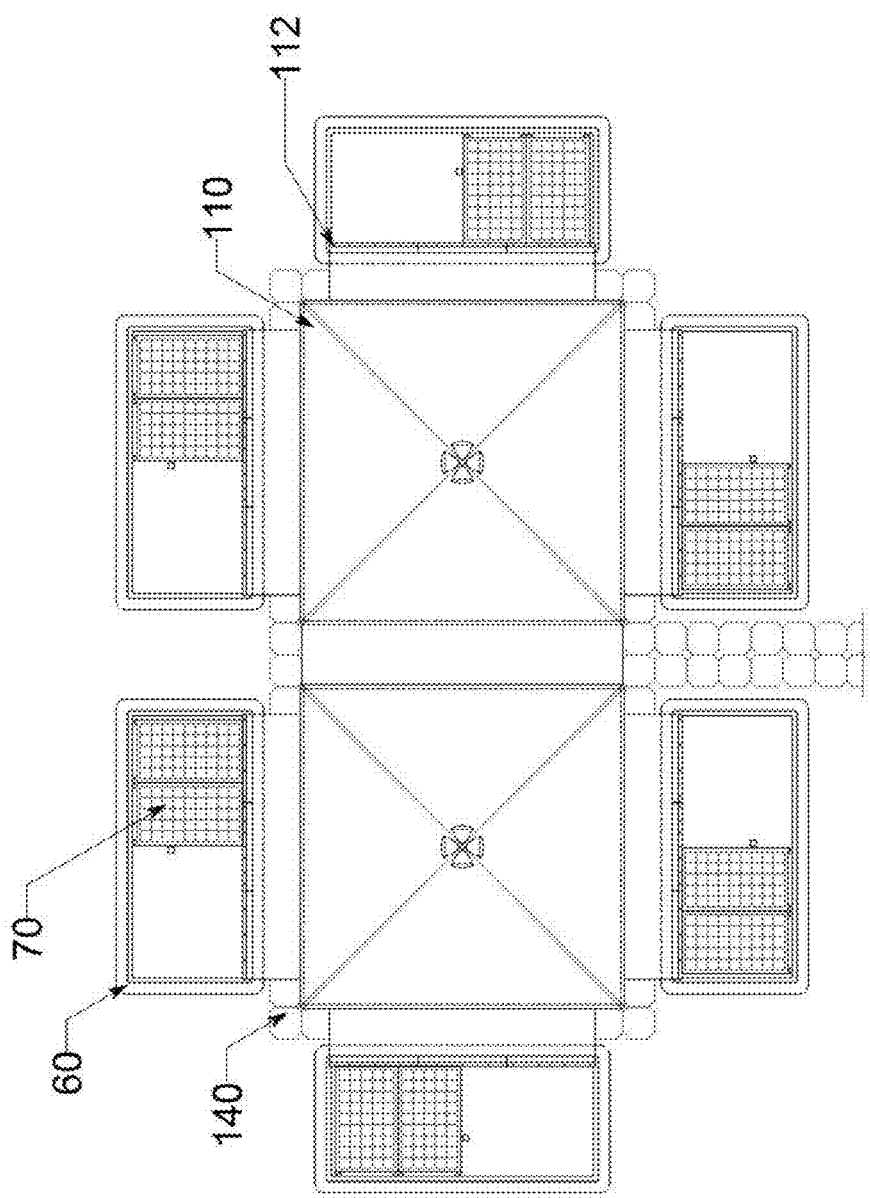
FIG. 22 is a top plan view of six FMU and floating pontoon assembly, according to an embodiment of the present invention.

FIG. 22 is yet another top plan view of six FMU 19 and floating pontoon plaza 144, according to an embodiment of the present invention. A FMU 19 comprises an integrated photovoltaic panel 70 located on the modular fiberglass mold top cap 60. The integrated photovoltaic panel 70 can be installed on either the left or right side of the modular fiberglass mold top cap 60.

Figure 23:
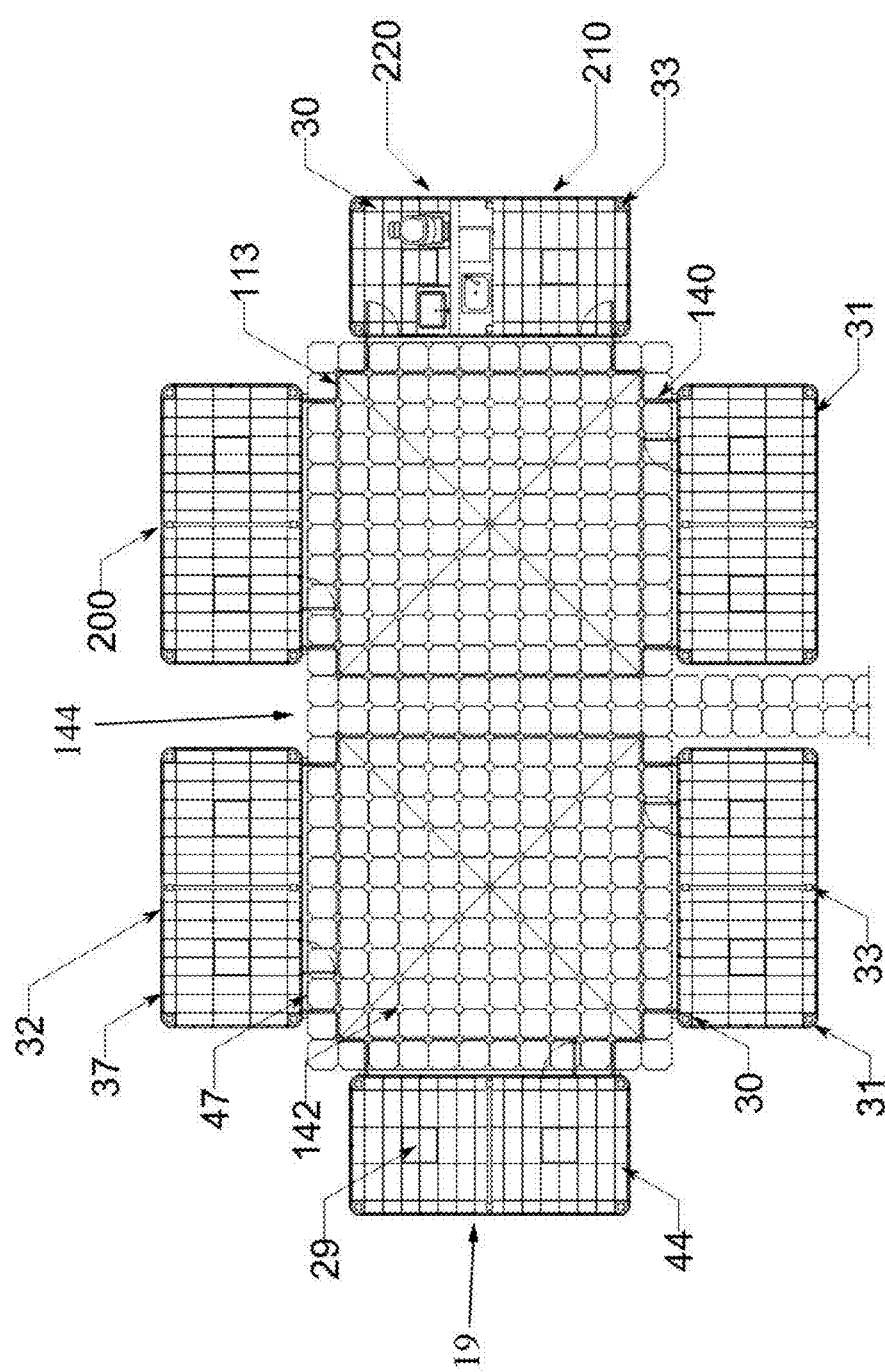
FIG. 23 is a plan view at the main deck level of six FMU and floating pontoon assembly, according to an embodiment of the present invention.

FIG. 23 is a plan view at the main deck level of six FMU 19 and floating pontoon plaza 144, according to an embodiment of the present invention. FIG. 23 illustrates six FMU 19 along the perimeter of a pontoon plaza 144. A FMU 19 can be considered a single room 200 or it can be subdivided into other uses such as a restroom area 220 and kitchen area 210. An embodiment of the present invention utilizes a dry composting toilet in the restroom area 220 that uses an aerobic processing system to treat human waste and the resultant compost to be used for horticultural or agricultural soil enrichment. FIG. 23 further illustrates the layout of the waterproof fabric sidewall with zipper 113 which allows an entry way between the FMU 19 and pontoon plaza 144. The FMU 19 is connected to the pontoon plaza 144 by a hinge plate connector 47. The user will have access to the level below the main deck through the lower access hatch 29. The FMU 19 can function as a dwelling unit, school or other suitable function. The uses of the FMU 19 tend to be more private in nature while the large pontoon plaza 144 is more public in nature and able to accommodate larger crowds of people.

Figure 24:
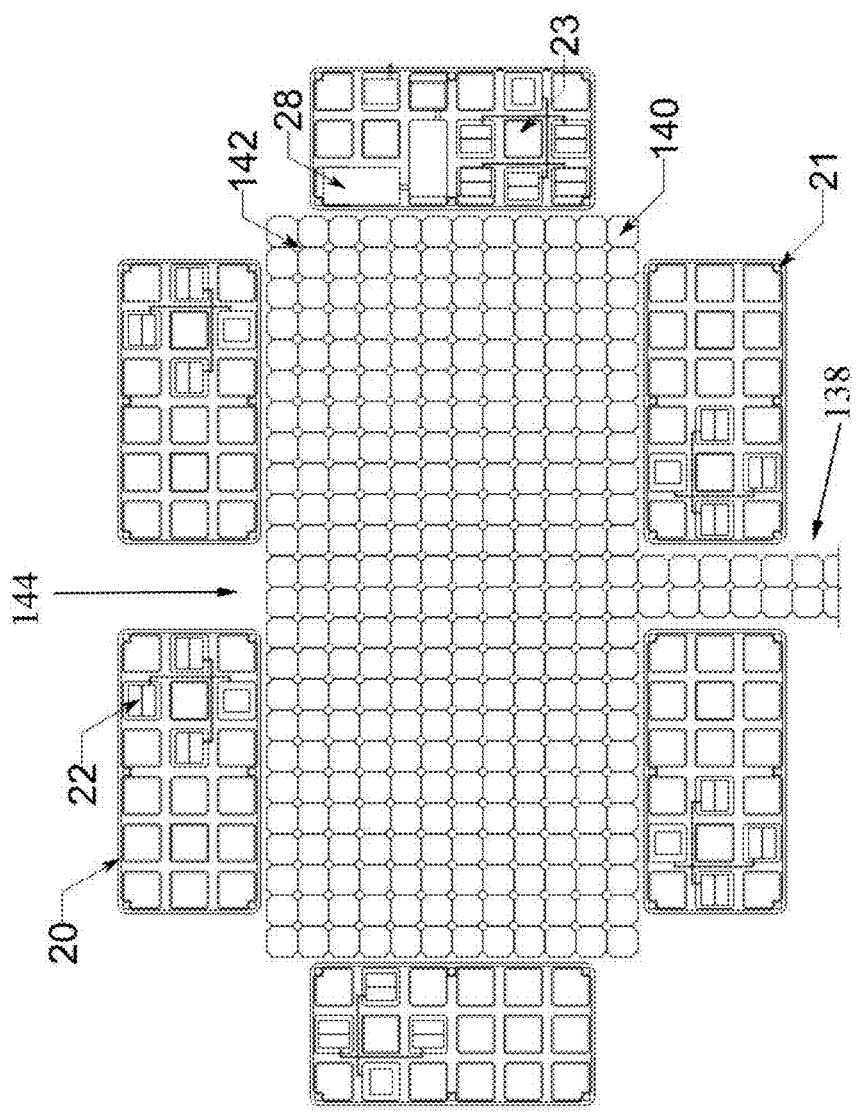
FIG. 24 is a bottom plan view below the deck level of six FMU and floating pontoon assembly and its components, according to an embodiment of the present invention.

FIG. 24 is a bottom plan view below the deck level of six FMU 19 and floating pontoon plaza 144 and its components, according to an embodiment of the present invention. These components are located in the modular fiberglass mold hull 20 section of the FMU 19 and comprise the photovoltaic system battery 22, photovoltaic system inverter 23, and polyethylene water cistern and purification module 28. FIG. 24 further illustrates the plurality of pontoon connector pins 142 that connect the IFPM 140 to create the pontoon plaza 144 or IFPM walkways 138.

Figure 25:
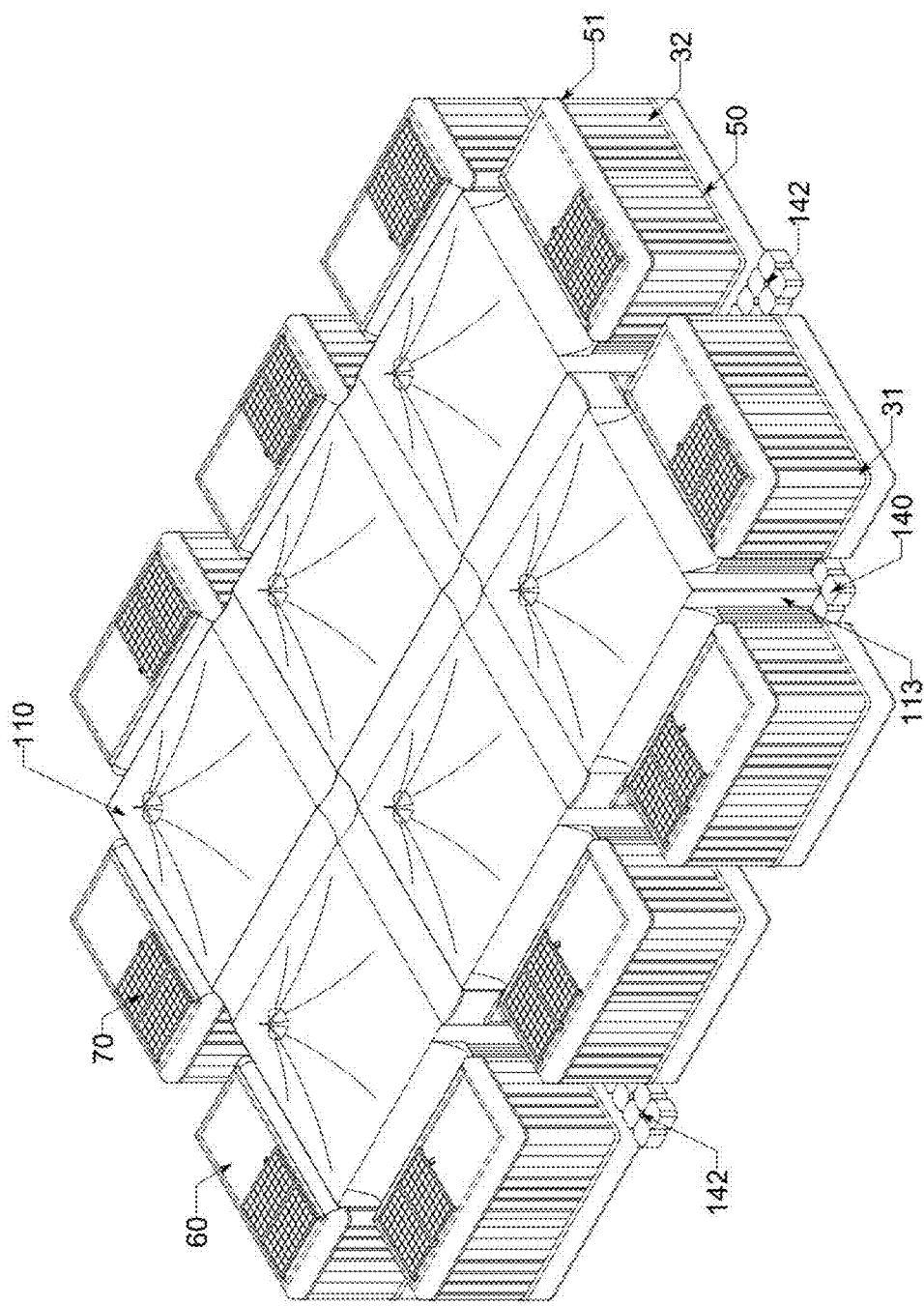
FIG. 25 is a perspective view of ten FMU and larger floating pontoon assembly with six erected tensile fabric canopies conjoined to create a larger water-proof assembly area suitable for a plurality of uses, according to an embodiment of the present invention.

FIG. 25 is a perspective view of ten FMU 19 and larger floating pontoon plaza 144 comprising six erected waterproof tensile fabric canopies-translucent 110 conjoined to create a larger water-proof assembly area suitable for a plurality of uses, according to an embodiment of the present invention.

Figure 26:
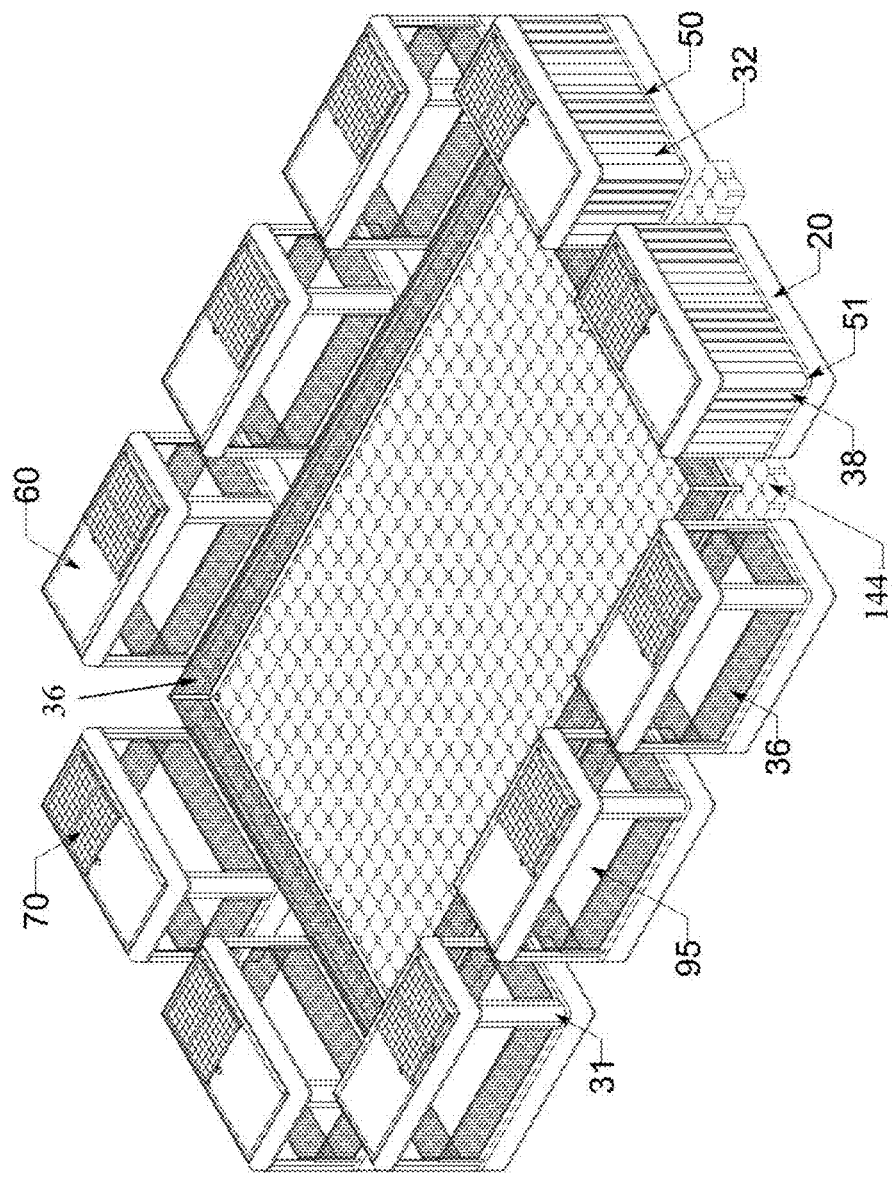
FIG. 26 is a perspective view of eight modified open sided FMU and two enclosed FMU and a larger floating pontoon assembly conjoined to create an open air assembly suitable for livestock or plurality of uses, according to an embodiment of the present invention.

FIG. 26 is a perspective view of eight open sided FMU 19 and two enclosed FMU 19 and a larger floating pontoon plaza 144 conjoined to create an open air assembly suitable for livestock or plurality of uses, according to an embodiment of the present invention. Eight of the ten FMU 19 replace the wall paneling with a protective fence guardrail 36, however, the fiberglass corner mold-outside edge 31 is not removed. A lowered protective fence guardrail 36 keeps livestock safe within the open sided FMU 19. These open sided FMU 19 also have native soil on fiberglass platform, flooring preferably used with livestock. A lowered protective fence guardrail 36 to accommodate a larger livestock area on the pontoon plaza 114 is also illustrated. The additional enclosed FMU 19 can function as rooms, storage, restroom or additional needs determined by the user.

Figure 27:
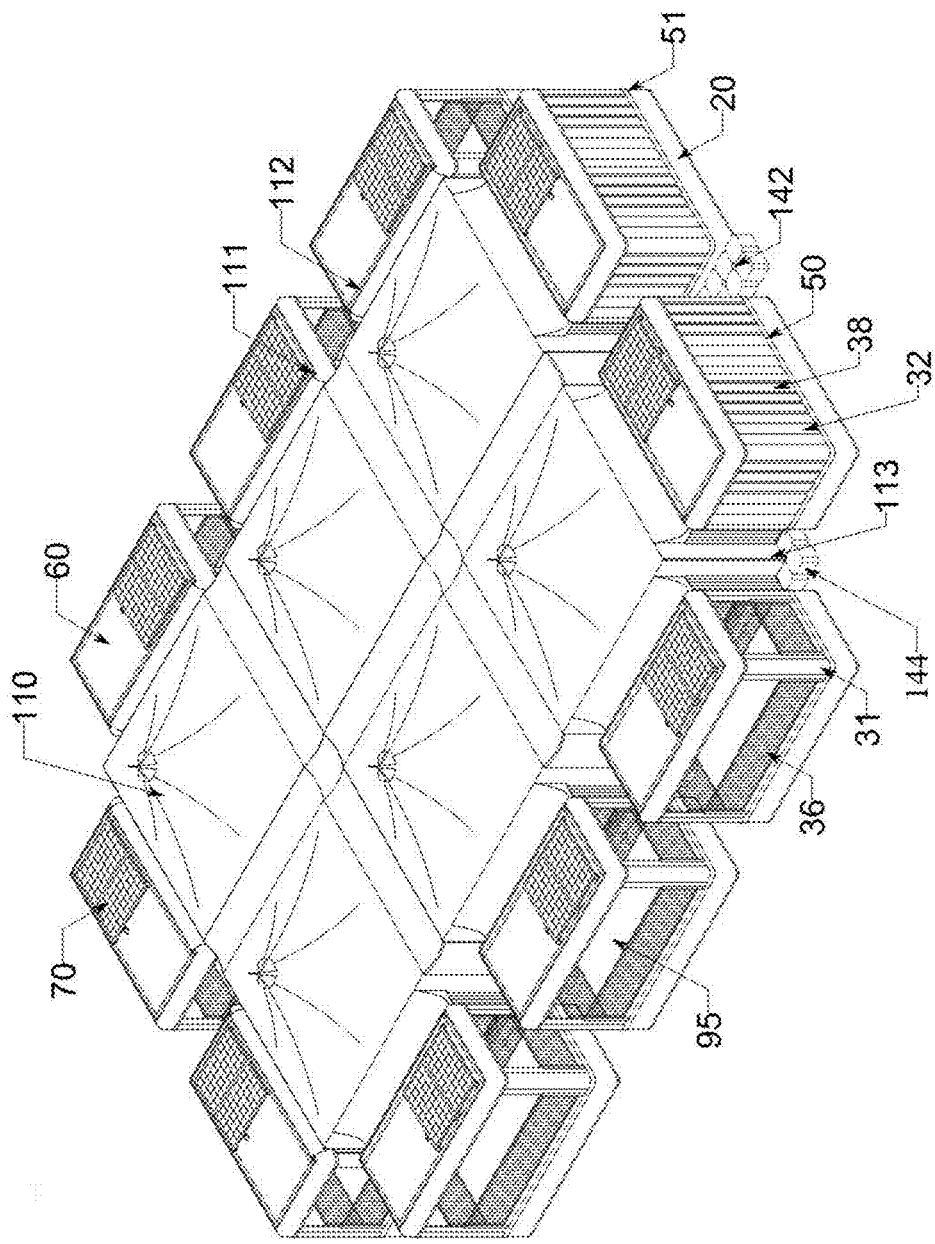
FIG. 27 is a perspective view showing eight modified open sided FMU and two enclosed FMU and a larger floating pontoon assembly with six erected tensile fabric canopies conjoined to create a water-proof and protected assembly suitable for livestock or plurality of uses, according to an embodiment of the present invention.

FIG. 27 is a perspective view showing eight open sided FMU 19 and two enclosed FMU 19 and a larger floating pontoon plaza 144 with six erected waterproof tensile fabric canopies-translucent 110 conjoined to create a water-proof and protected assembly suitable for livestock or plurality of uses, according to an embodiment of the present invention. An embodiment of the present invention allows the floating pontoon plaza 144 to be open to air as these canopies can easily erected or dismantled by people similar in the manner as a typical tent. The additional enclosed FMU 19 can function as rooms, storage, restroom or additional needs determined by the user.

Figure 28:
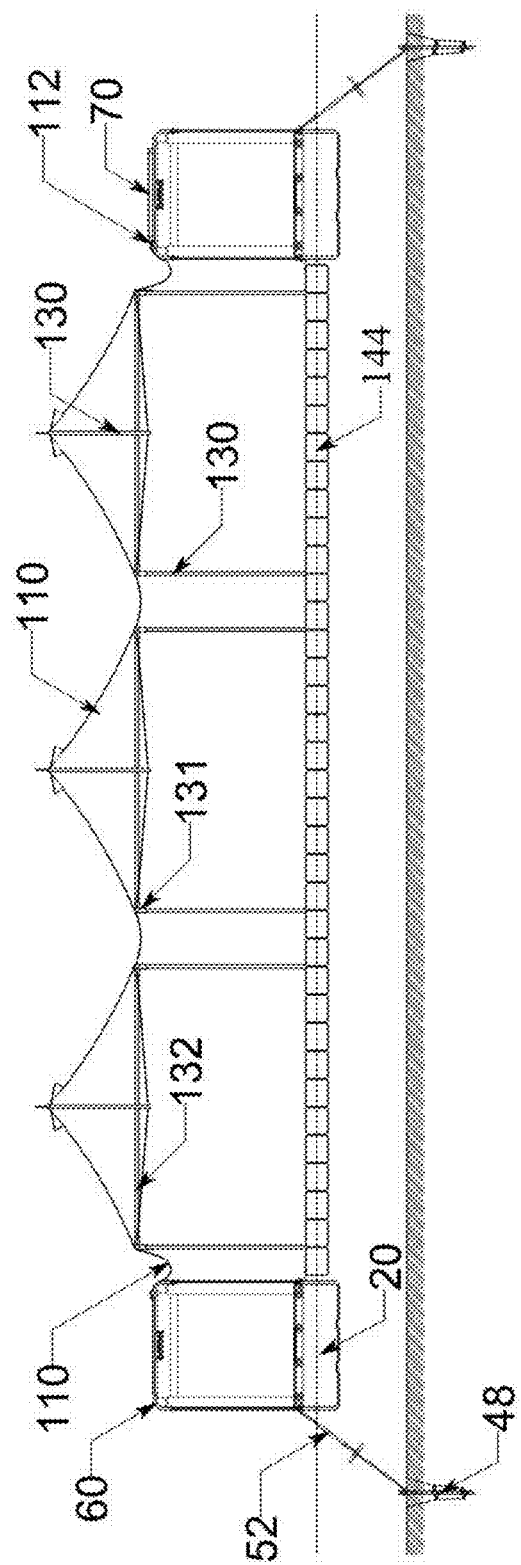
FIG. 28 is a sectional view thru a ten FMU and floating pontoon assembly with six erected tensile fabric canopies, according to an embodiment of the present invention.

FIG. 28 is a sectional view thru a ten FMU 19 and floating pontoon plaza 144 with six erected waterproof tensile fabric canopies-translucent 110, according to an embodiment of the present invention.

Figure 29:
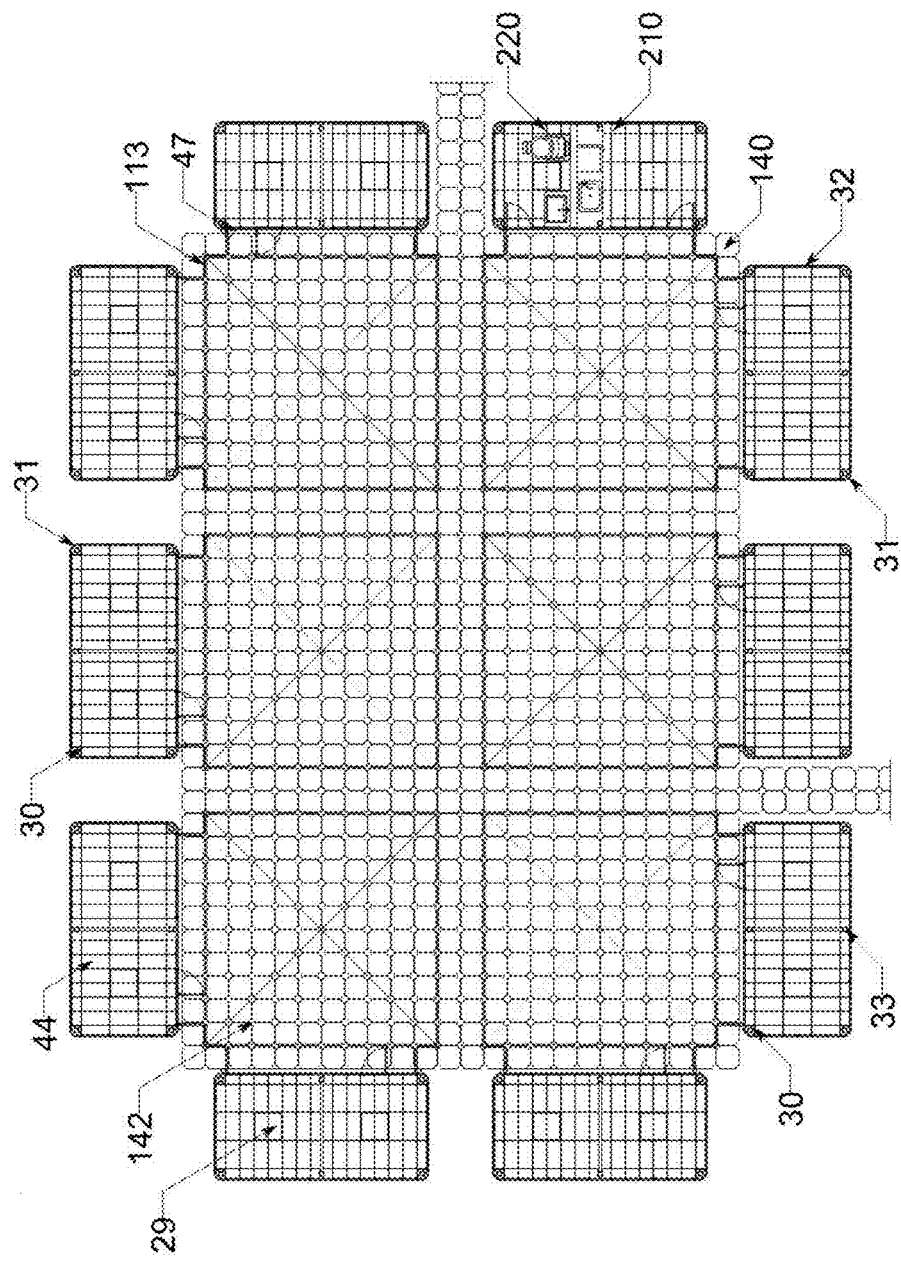
FIG. 29 is a plan view at the main deck level of ten FMU and a larger floating pontoon assembly conjoined to create a larger assembly area suitable for a plurality of uses, according to an embodiment of the present invention.

FIG. 29 is a plan view at the main deck level of ten FMU 19 and a larger floating pontoon plaza 144 conjoined to create a larger assembly area suitable for a plurality of uses, according to an embodiment of the present invention. The overall configuration can function as a dwelling unit, school or other suitable function. The uses of the FMU 19 as illustrated tend to be more private in nature while the large central pontoon plaza 144 created by the IFPM 140 would be more public in nature and able to accommodate larger crowds of people.

Figure 30:
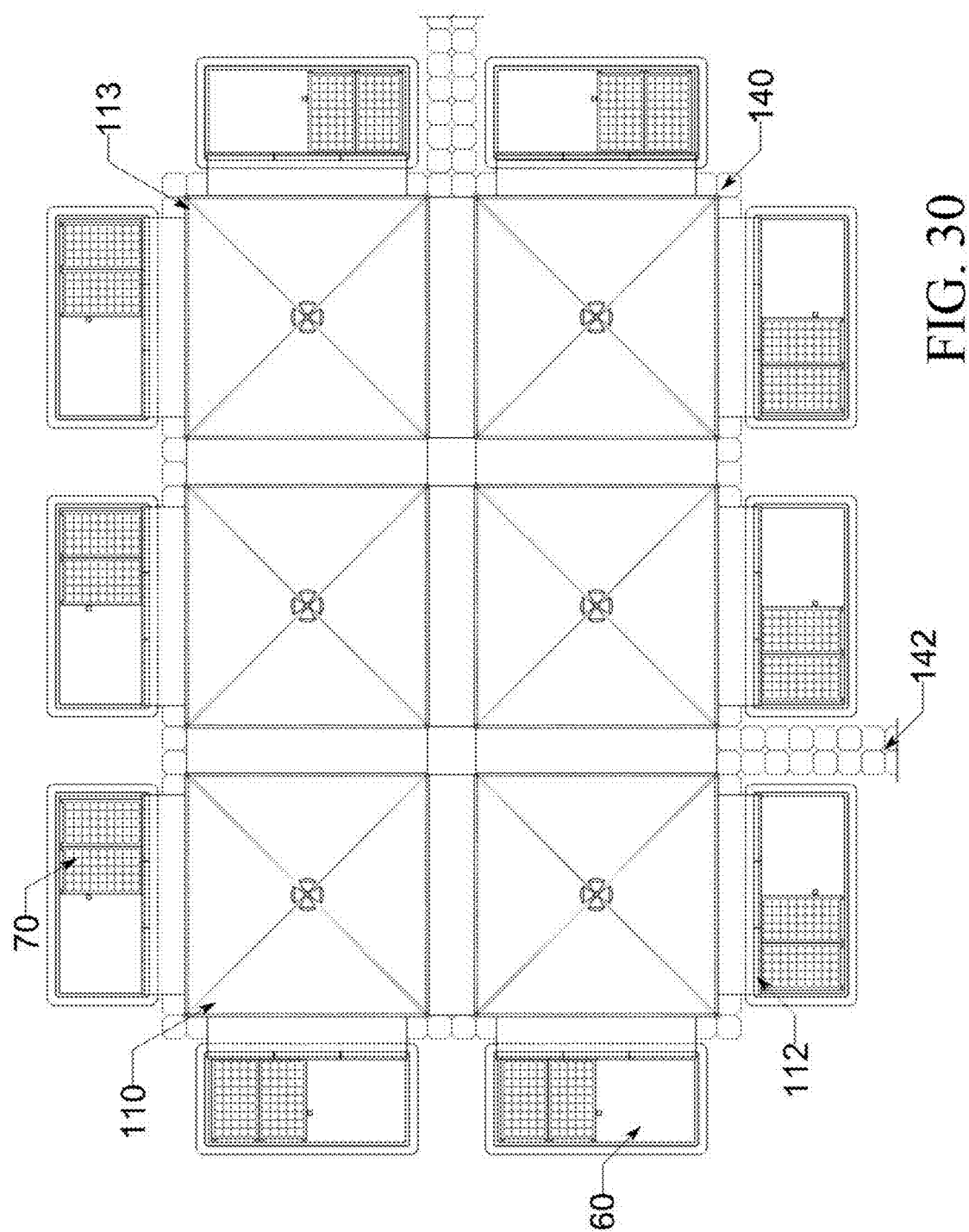
FIG. 30 is a top plan view of ten FMU and a larger floating pontoon assembly with six erected tensile fabric canopies conjoined to create a larger water-proof assembly area suitable for a plurality of uses, according to an embodiment of the present invention.

FIG. 30 is a top plan view of ten FMU 19 and a larger floating pontoon plaza 144 with six erected waterproof tensile fabric canopies-translucent 110 conjoined to create a larger water-proof assembly area suitable for a plurality of uses, according to an embodiment of the present invention.

Figure 31:
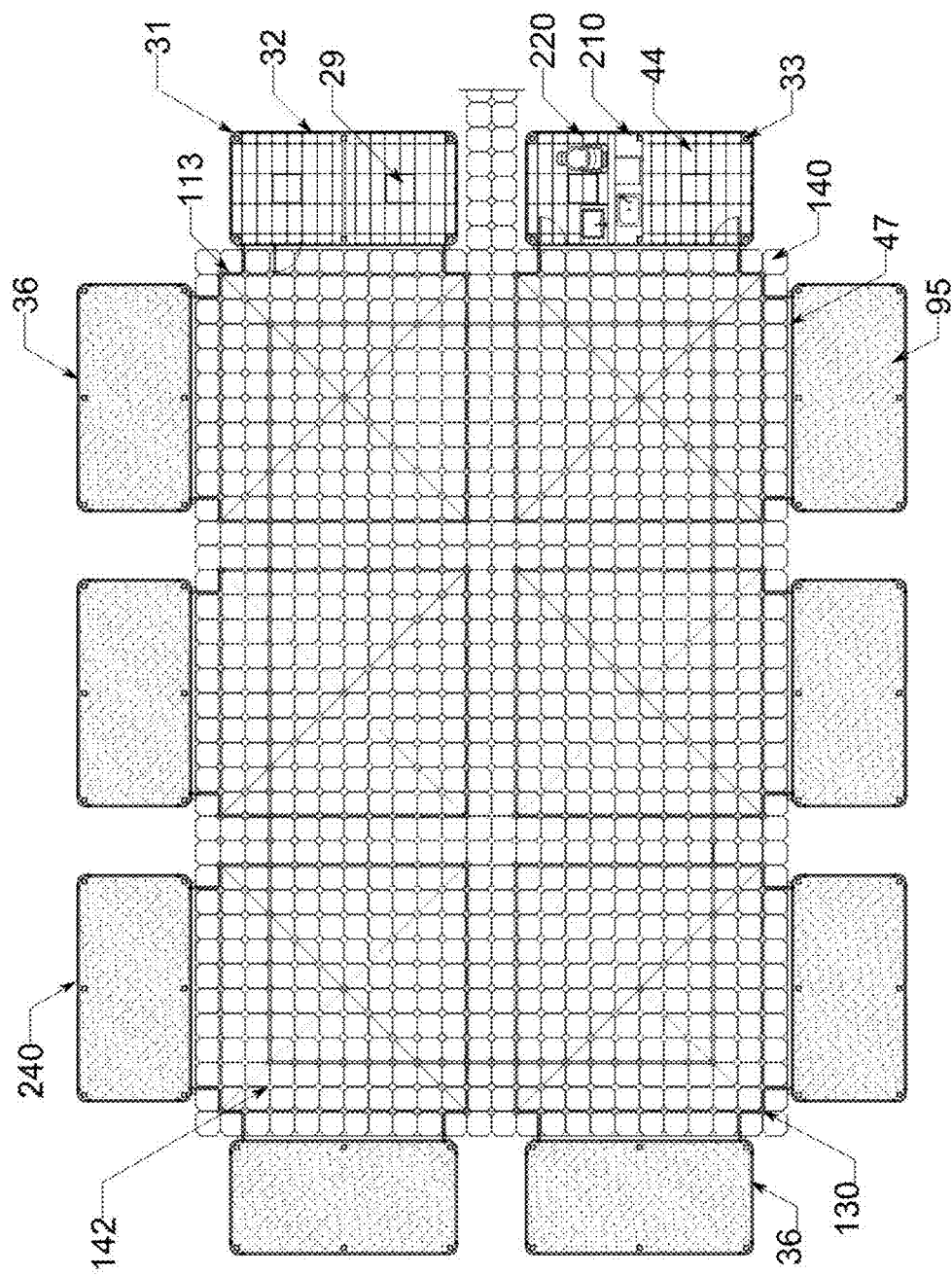
FIG. 31 is a top plan view at deck level of eight modified open sided FMU and two enclosed FMU and a larger floating pontoon assembly with six erected tensile fabric canopies conjoined to create a water-proof and protected assembly suitable for livestock or plurality of uses, according to an embodiment of the present invention.

FIG. 31 is a top plan view at deck level of eight open sided FMU 19 and two enclosed FMU 19 and a larger floating pontoon plaza 144 with six erected waterproof tensile fabric canopies-translucent 110 conjoined to create a water-proof and protected assembly suitable for livestock or plurality of uses, according to an embodiment of the present invention. An advantage of an embodiment of the present invention is that it is easily modified to accommodate native soil on fiberglass platform flooring 95, which works better with livestock. Eight of the ten FMU 19 are open to air with lowered protective fence guardrails 36 along the perimeter of the pontoon plaza 144. This is to keep livestock secure in their designated areas as the FMU-livestock 240 and two enclosed FMU 19 are provided to allow an enclosed room and separate restroom area 220 and kitchen area 210. The configuration shown could easily be considered a small farm or part of a larger farm if combined with additional configurations. The configuration can be easily reduced, expanded or added onto.

Figure 32:
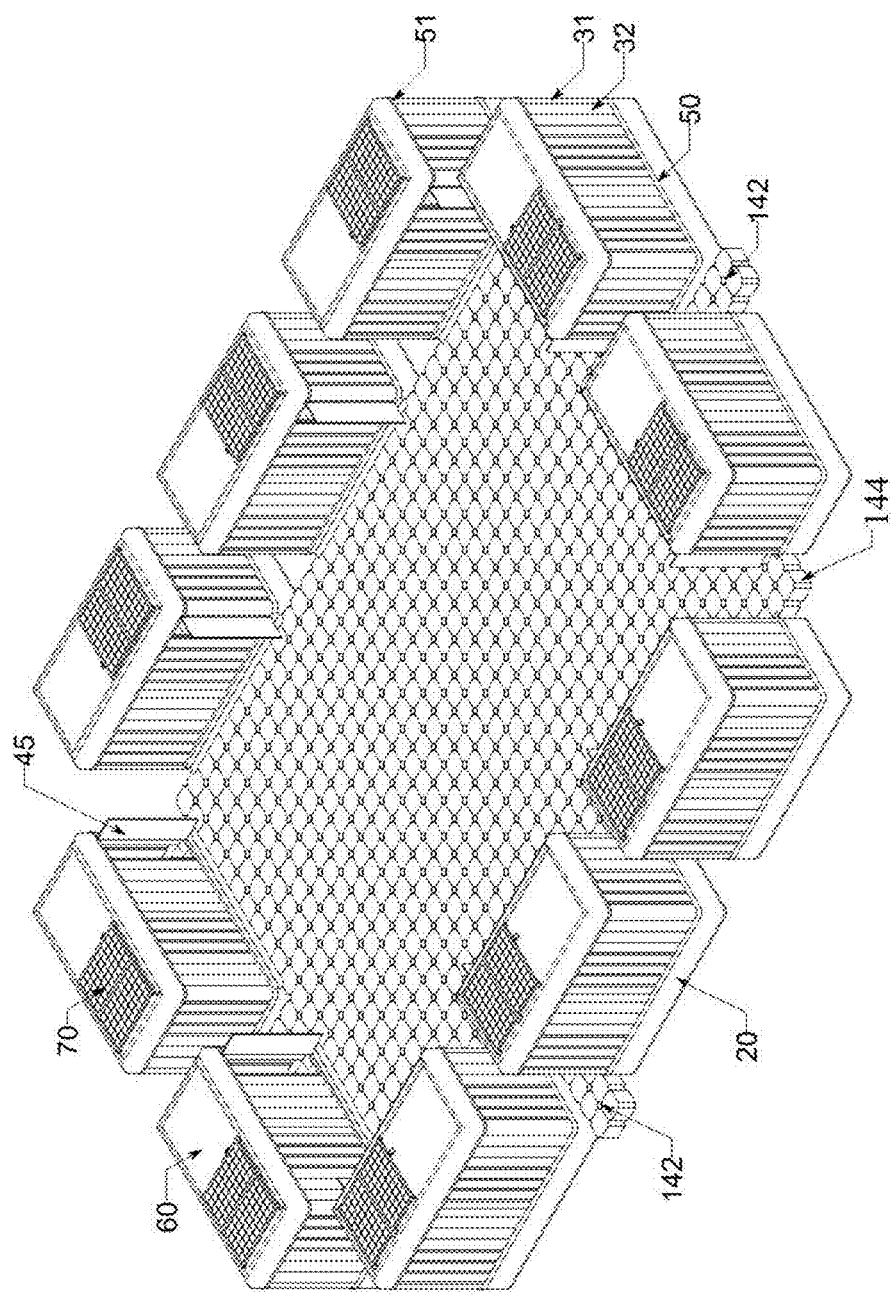
FIG. 32 is a perspective view of ten FMU and a larger floating pontoon assembly conjoined to create a larger assembly area suitable for a plurality of uses, according to an embodiment of the present invention.

FIG. 32 is a perspective view of ten FMU 19 and a larger floating pontoon plaza 144 conjoined to create a larger assembly area suitable for a plurality of uses, according to an embodiment of the present invention. An advantage of the much larger surface area is that it will provide more stability in the water while accommodating larger groups of users. Users will have access to the enclosed FMU 19 by the door assembly 45. FIG. 32 illustrates how users can have both privacy and togetherness through enclosed FMU 19 connected to a pontoon plaza 144.

Figure 33:
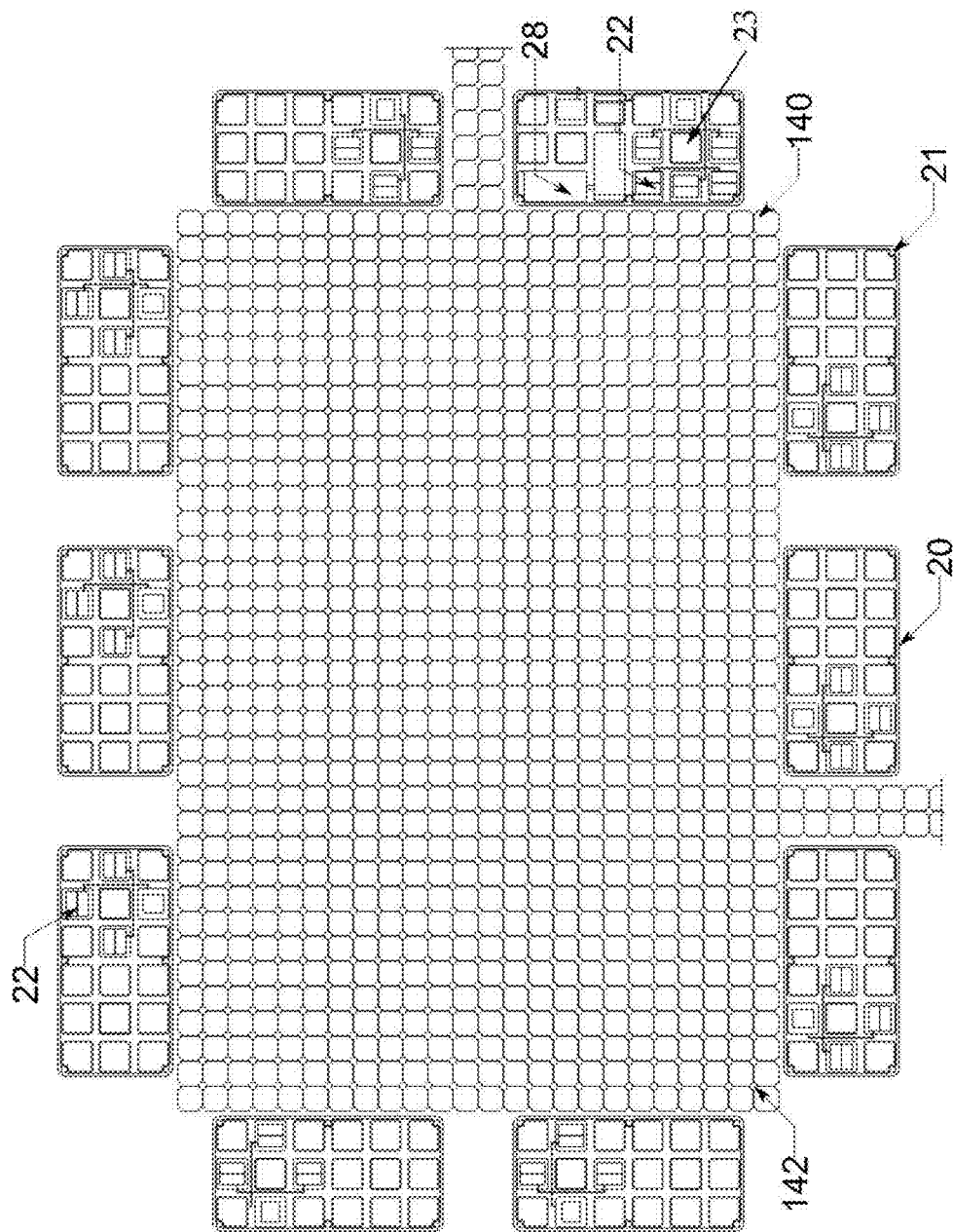
FIG. 33 is a bottom plan view below the deck level of ten FMU and a larger floating pontoon assembly conjoined to create a larger assembly area suitable for a plurality of uses and its components, according to an embodiment of the present invention.

FIG. 33 is a bottom plan view below the deck level of ten FMU 19 and a larger floating pontoon plaza 144 conjoined to create a larger assembly area suitable for a plurality of uses and its components, according to an embodiment of the present invention. These components comprise photovoltaic system battery 22, photovoltaic system inverter 23, and polyethylene water cistern and purification module 28. The corner column insert sleeve 21, is a pre-molded cavity into the modular fiberglass mold hull 20 that accommodates a fiberglass reinforced plastic structure column 33 (not shown).

Figure 34:
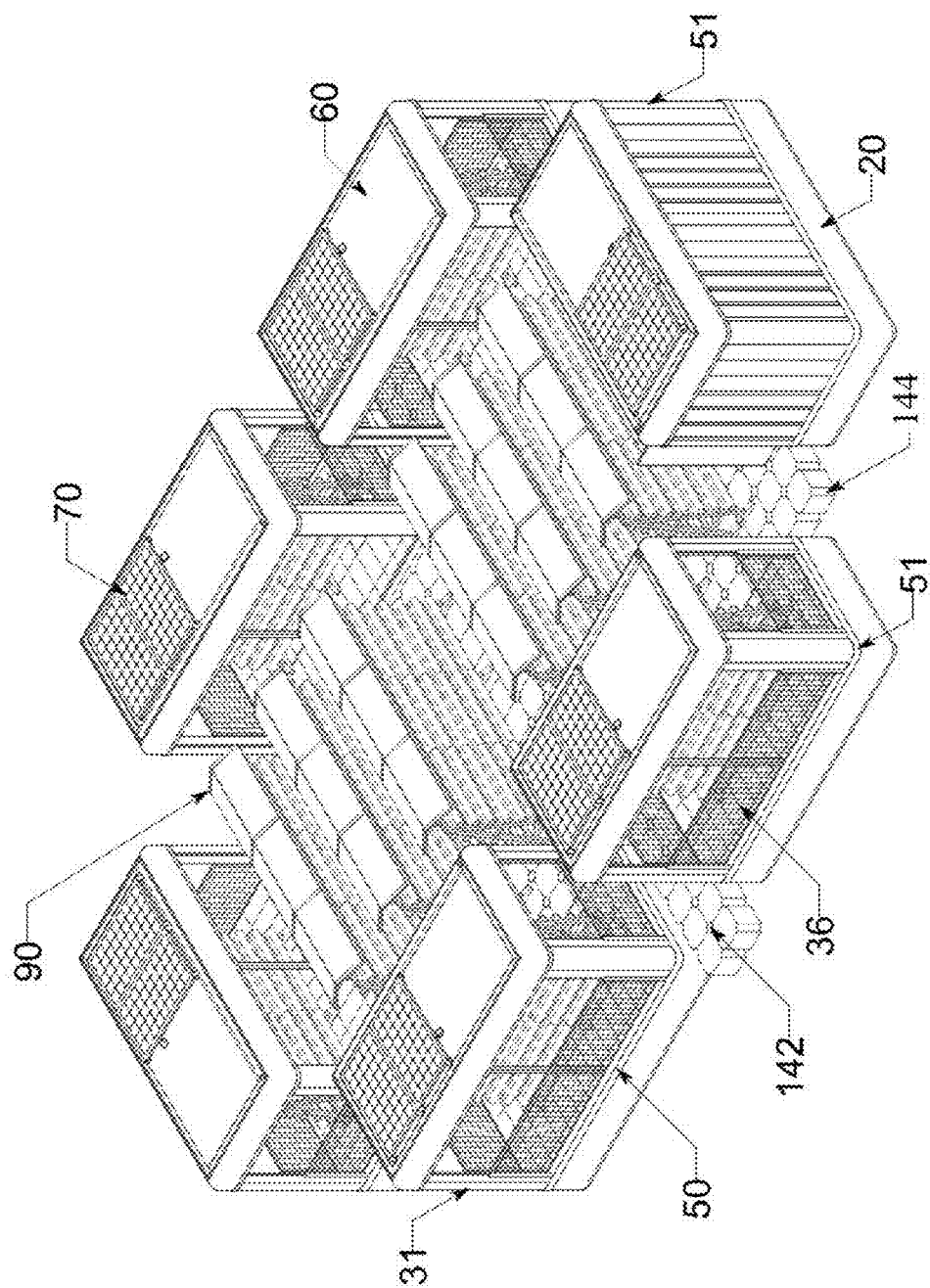
FIG. 34 is a perspective view of five modified open sided FMU and one enclosed FMU and a larger floating pontoon assembly conjoined to serve as an open air floating aquaponics farm, according to an embodiment of the present invention.

FIG. 34 is a perspective view of five open sided FMU 19 and one enclosed FMU 19 and a larger floating pontoon plaza 144 conjoined to serve as an open air floating aquaponics farm, according to an embodiment of the present invention. FIG. 25 shows the linear stacking nature of the aquaponics tank system 90 on the larger floating pontoon plaza 144 and the open sided FMU 19 which allows users to be extremely efficient with respect to horticulture needs. By placing these farming abilities in a controlled, safe floating environment, users can extend the growing season to continue without interruption. The configuration can be reduced, expanded or added to additional like or different configurations based on user needs and requirements.

Figure 35:
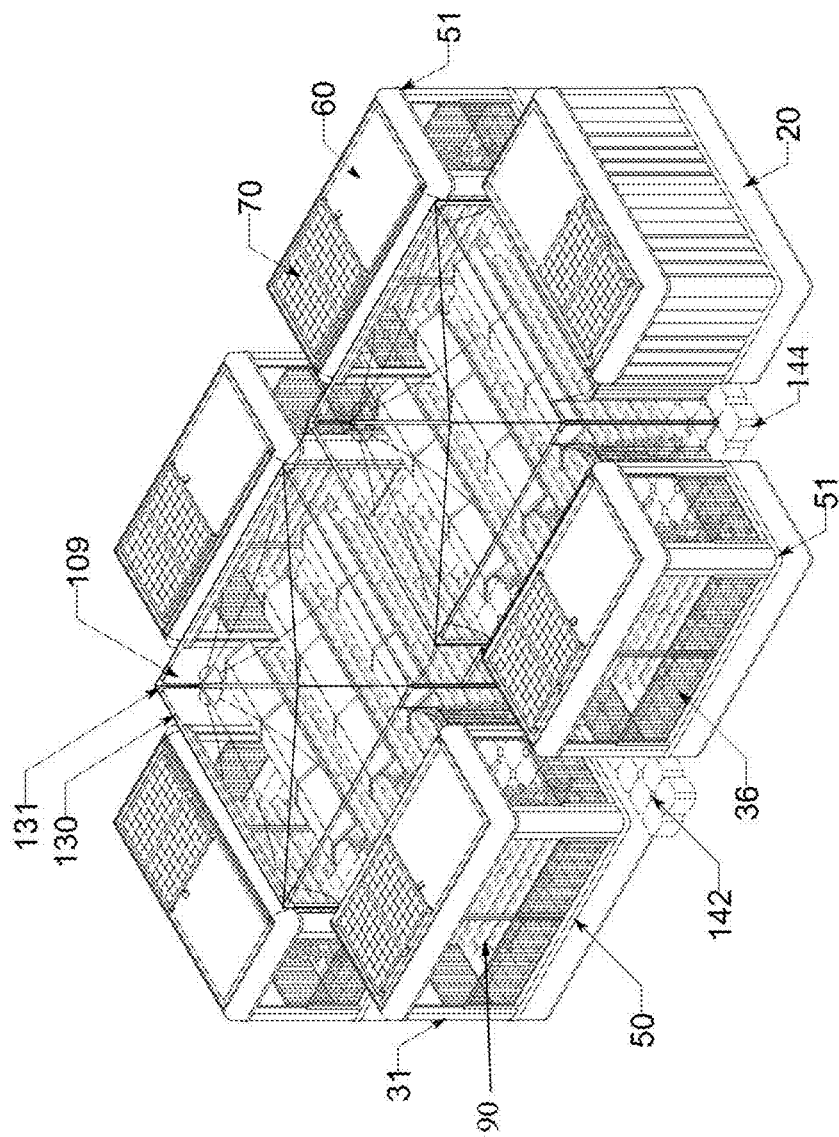
FIG. 35 is a perspective view of five modified open sided FMU and one enclosed FMU and a larger floating pontoon assembly with two erected transparent tensile fabric canopies conjoined to serve as an enclosed floating aquaponics farm, according to an embodiment of the present invention.

FIG. 35 is a perspective view of five modified open sided FMU 19 and one enclosed FMU 19 and a larger floating pontoon plaza 144 with two erected waterproof tensile fabric canopy-clear/transparent 109 conjoined to serve as an enclosed floating aquaponics farm, according to an embodiment of the present invention. The transparent nature of the waterproof tensile fabric canopy-clear/transparent 109 allows photosynthesis to occur for plant growth. Similar to FIG. 34, the illustration shows the linear stacking nature of the aquaponics tank system 90 which allows users to be extremely efficient with respect to horticulture needs.

Figure 36:
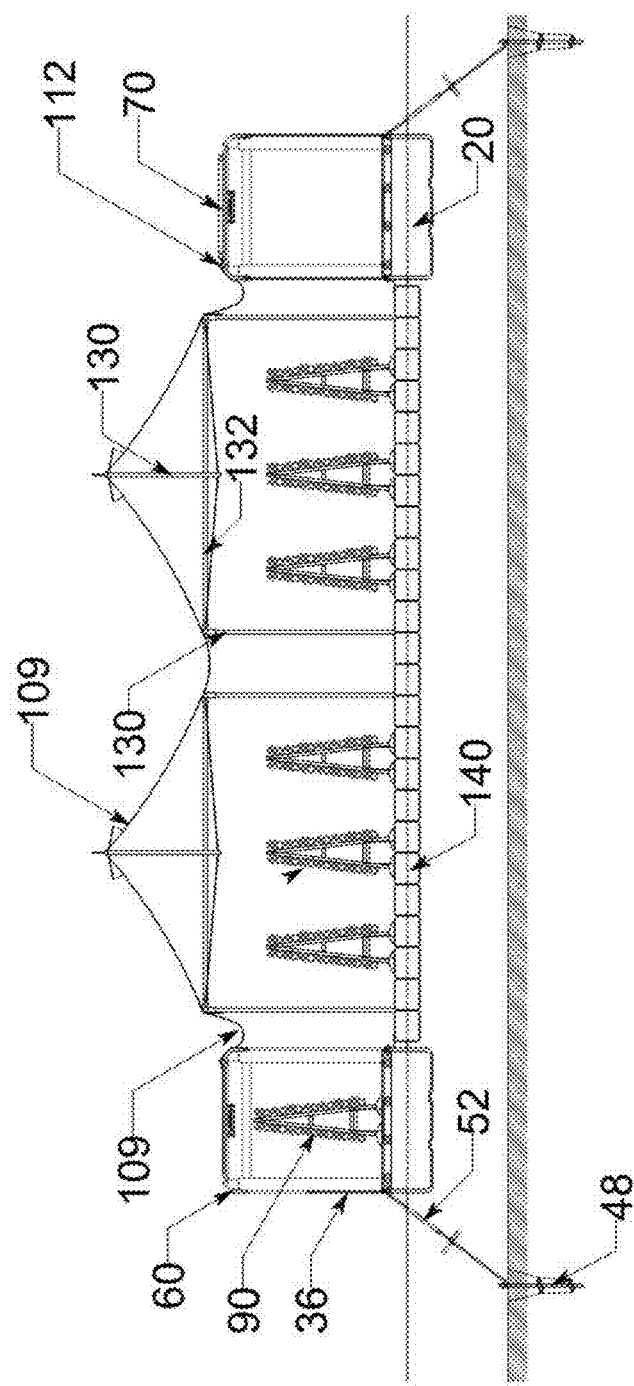
FIG. 36 is a sectional view thru five modified open sided FMU and one enclosed FMU and a larger floating pontoon assembly with two erected tensile fabric canopies conjoined to serve as an enclosed floating aquaponics farm, according to an embodiment of the present invention.

FIG. 36 is a sectional view thru five open sided FMU 19 and one enclosed FMU 19 and a larger floating pontoon plaza 144 with two erected waterproof tensile fabric canopy-clear/transparent 109 conjoined to serve as an enclosed floating aquaponics farm, according to an embodiment of the present invention. FIG. 36 illustrates the waterproof tensile fabric canopy-clear/transparent 109, is elevated by the vertical canopy structural member 130 and connected to the outlying FMU 19 by a hinge plate connector 47 (not shown) with aquaponic tank system 90 placed throughout the FMU 19 and floating pontoon plaza 144.

Figure 37:
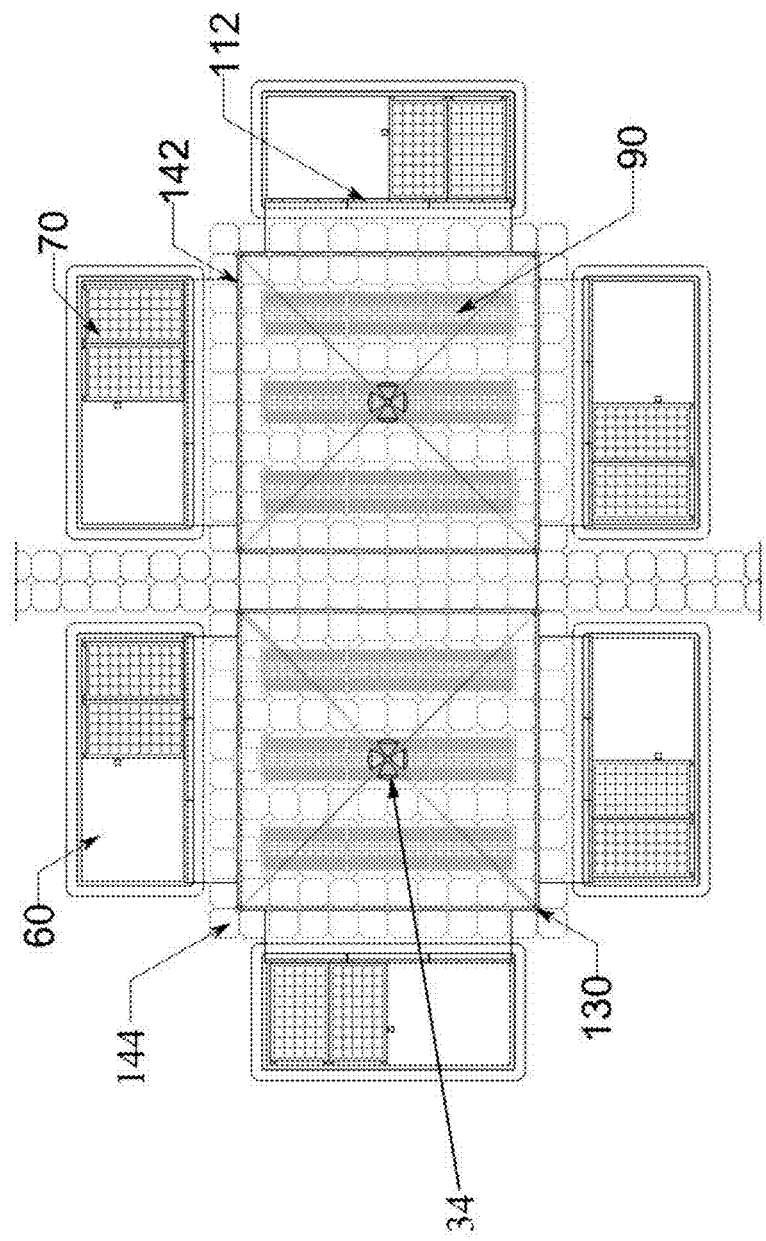
FIG. 37 is a top plan view of five modified open sided FMU and one enclosed FMU and a larger floating pontoon assembly with two erected transparent tensile fabric canopies conjoined to serve as an enclosed floating aquaponics farm, according to an embodiment of the present invention.

FIG. 37 is a top plan view of five open sided FMU 19 and one enclosed FMU 19 and a larger floating pontoon plaza 144 with two erected waterproof tensile fabric canopy-clear/transparent 109 conjoined to serve as an enclosed floating aquaponics farm, according to an embodiment of the present invention.

Figure 38:
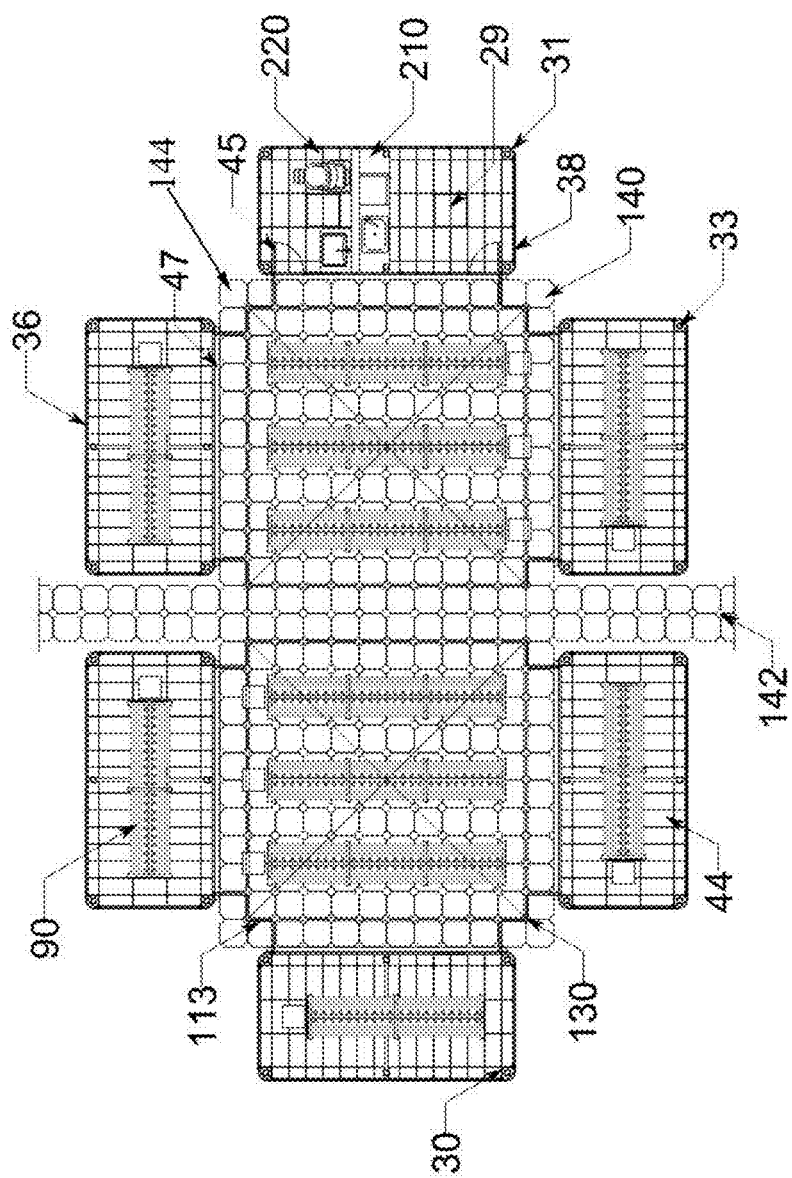
FIG. 38 is a top plan view at deck level of five modified open sided FMU and one enclosed FMU and a larger floating pontoon assembly with two erected transparent tensile fabric canopies conjoined to serve as an enclosed floating aquaponics farm, according to an embodiment of the present invention.

FIG. 38 is a top plan view at deck level of five open sided FMU 19 and one enclosed FMU 19 and a larger floating pontoon plaza 144 with two erected waterproof tensile fabric canopy-clear/transparent 109 conjoined to serve as an enclosed floating aquaponics farm, according to an embodiment of the present invention. The configuration shown also provides an enclosed FMU 19 for restroom area 220 and kitchen area 210.

Figure 39:
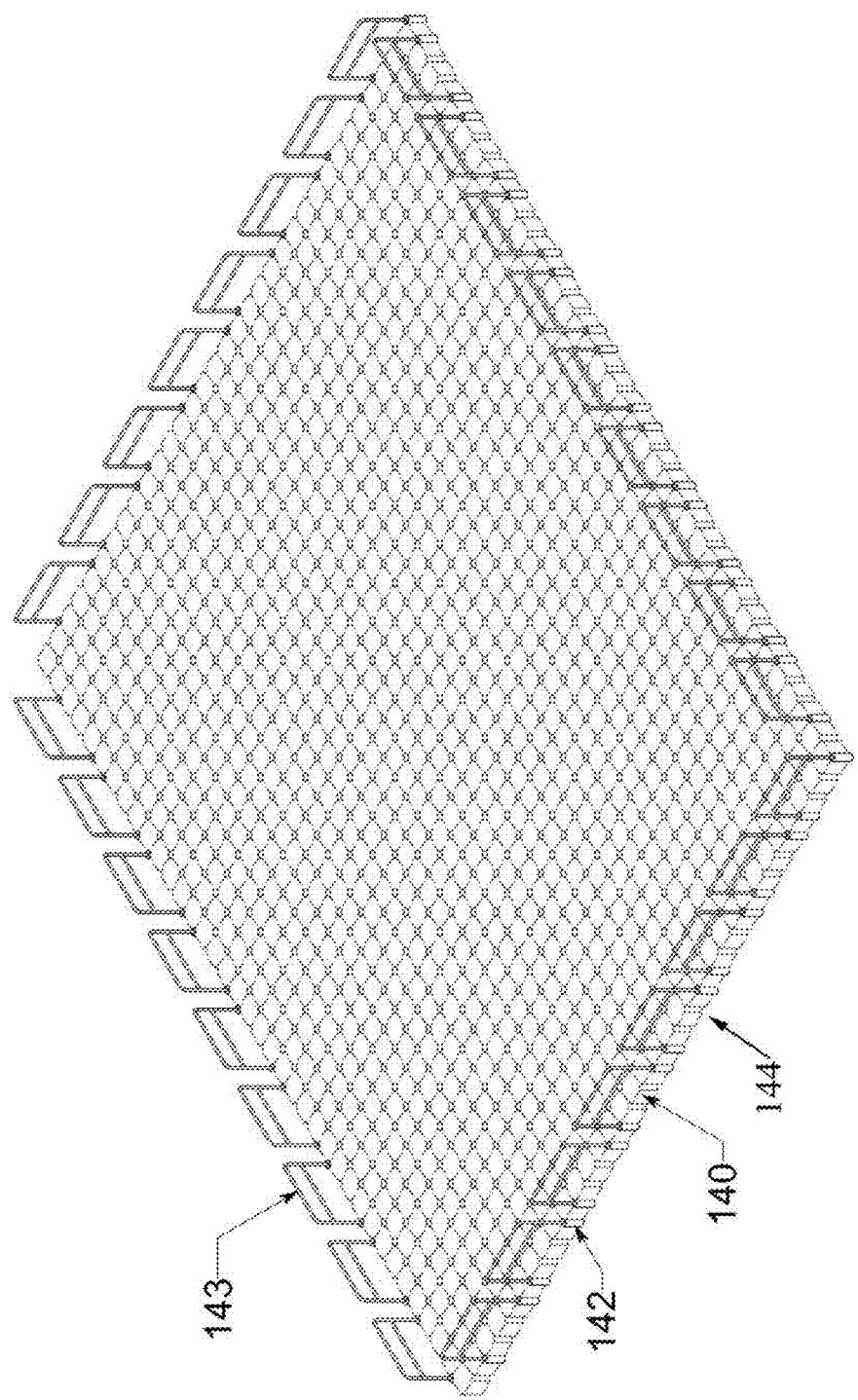
FIG. 39 is a perspective view of a series of floating pontoon assembly configured to create a large open air plaza, according to an embodiment of the present invention.

FIG. 39 is a perspective view of a series of floating IFPM 140 configured to create a large open air pontoon plaza 144, according to an embodiment of the present invention. An embodiment of the present invention allows and accommodates the ability to vary the number of IFPM 140 to create a plurality of size configurations to accommodate user needs. The configuration illustrated in FIG. 39 like all preceding and following configurations can be attached to other similar or dissimilar configurations to create a large community as seen in FIG. 41 or a plurality of other configurations based on user needs.

Figure 40:
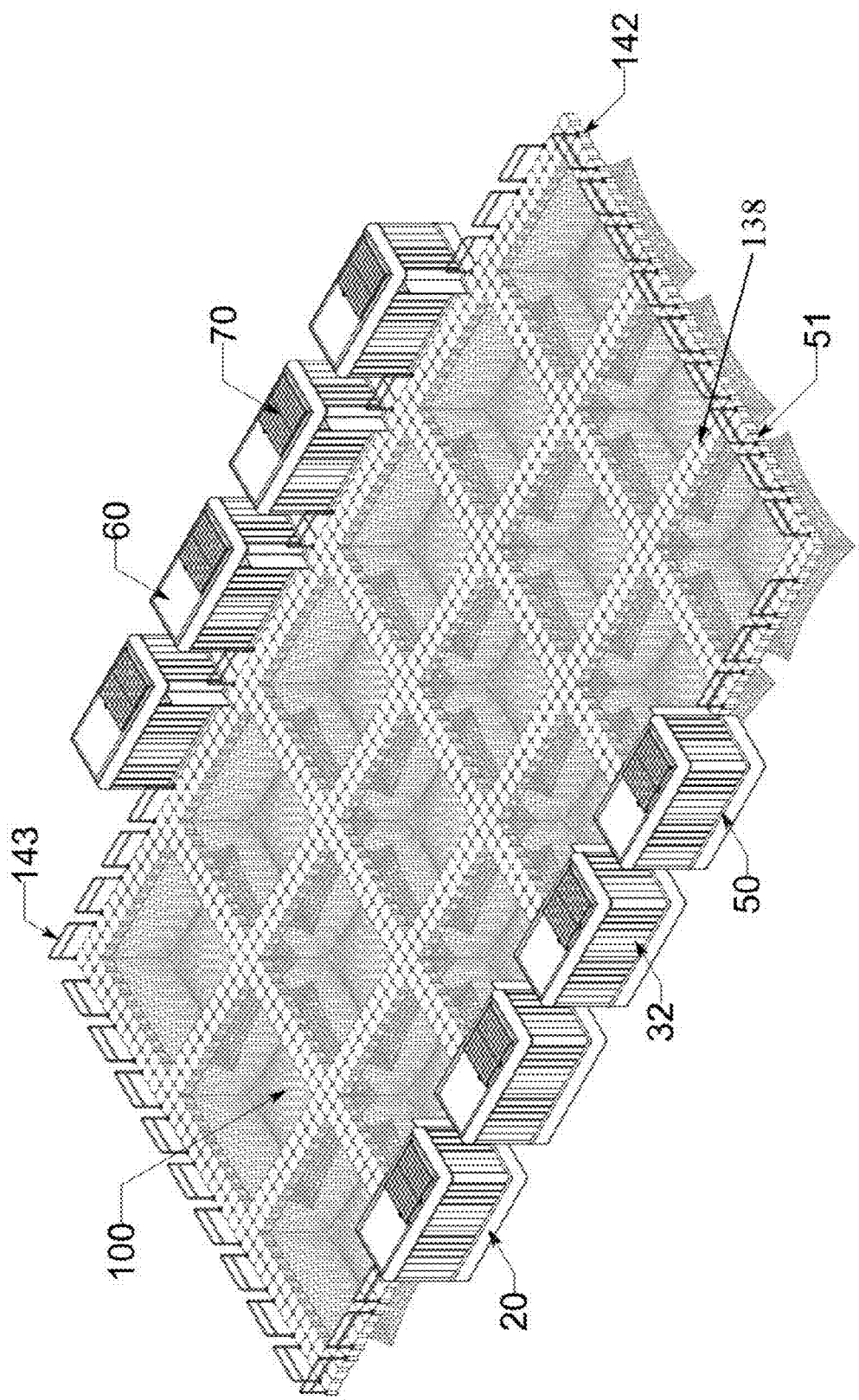
FIG. 40 is a perspective view of eight enclosed FMU attached to a series of floating pontoon assembly and eighteen underwater fish basins conjoined to function as a fish farm, according to an embodiment of the present invention.

FIG. 40 is a perspective view of eight enclosed FMU 19 attached to a series of floating pontoon plaza 144 and eighteen nylon netting fish basin 100 conjoined to function as a fish farm, according to an embodiment of the present invention. These eighteen nylon netting fish basin 100 create a fine water permeable mesh netting that allows the fish to remain in little fish pools that utilize existing water from their natural habitat. These pools are accessed by the IFPM walkways 138. The eight enclosed FMU 19 can be used for a plurality of uses including, but not limited to, cold storage, dry-fish storage, sleeping quarters, storage, restroom and kitchen.

Figure 41:
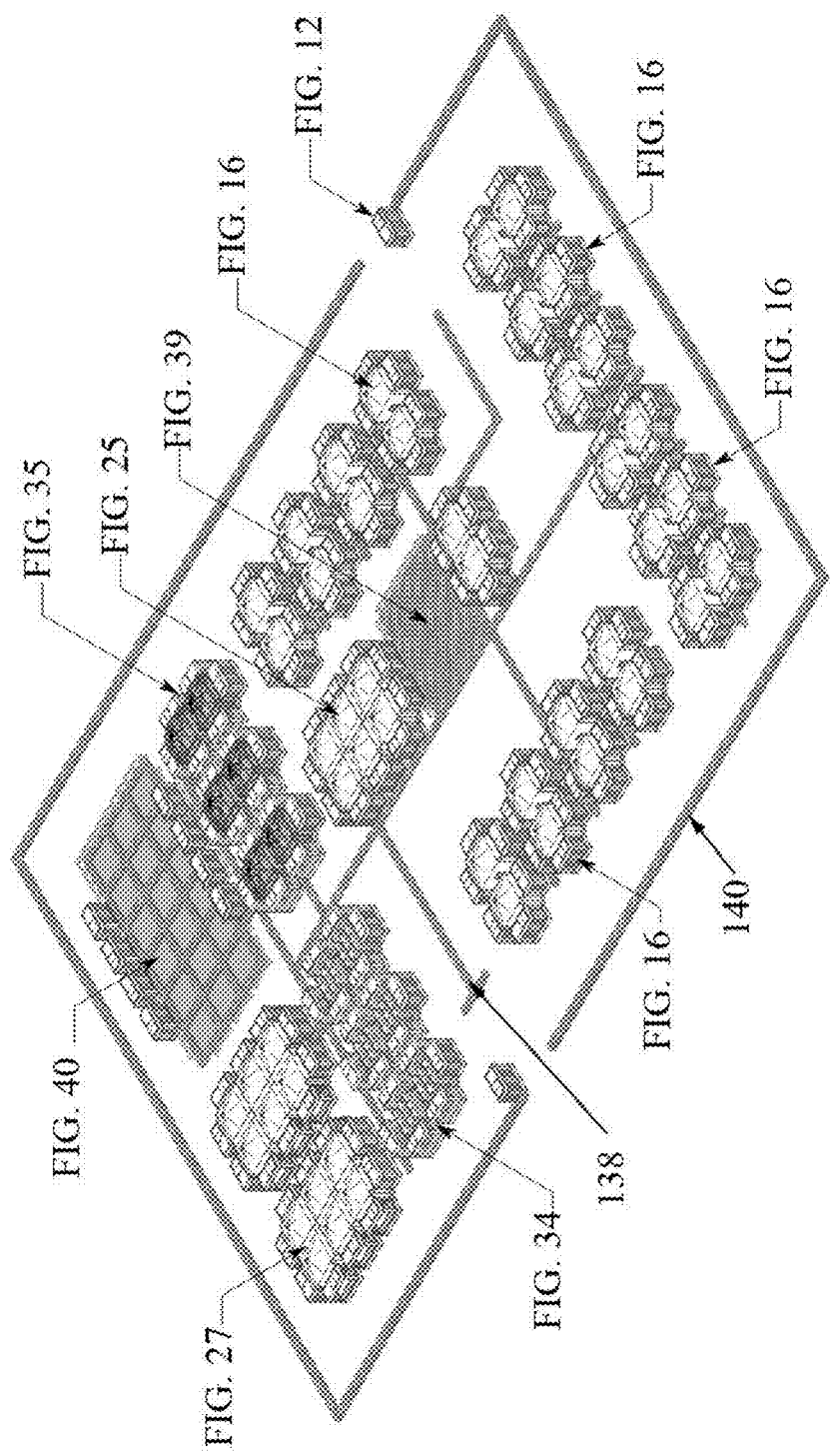
FIG. 41 is a perspective view showing various FMU configurations arranged and attached to each other to create a floating community, according to an embodiment of the present invention.

FIG. 41 is a perspective view showing various FMU 19 configurations arranged and attached to each other to create a floating community, according to an embodiment of the present invention. A plurality of configuration can be created to meet the current and evolving needs of its intended users while providing a more sustainable community. FIG. 41 illustrates an overall floating masterplan of how the many previously cited program configurations in the preceding figures are attached to one another by means of the IFPM 140 and hinge plate connector 47 to create a larger community while also allowing boat access to the many perimeter edges. An additional layer of IFPM 140 stacked several layers high can be added along the outermost perimeter edge to provide additional security to the masterplan community similar to the outer walls of a castle.

Figure 42:
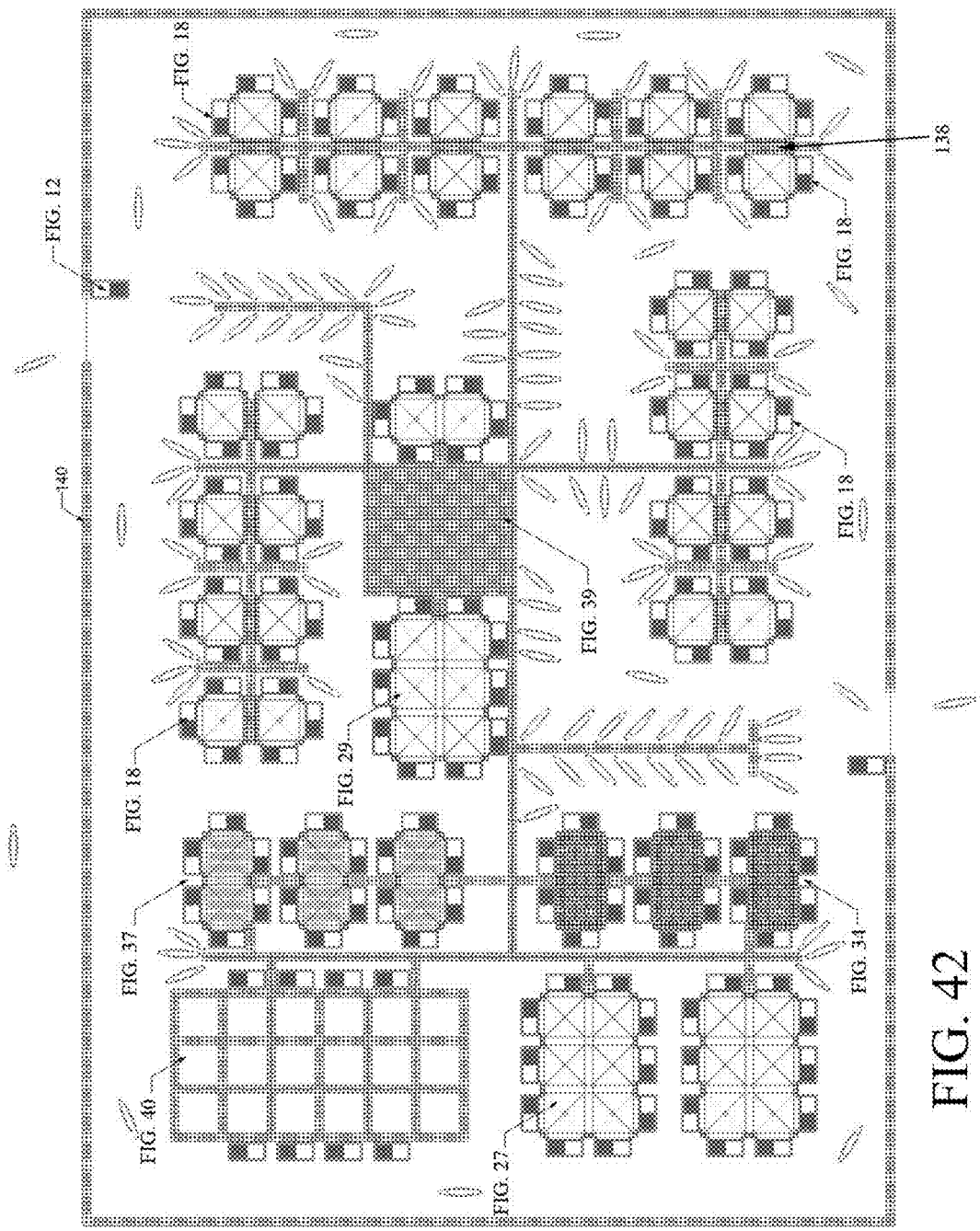
FIG. 42 is a top plan view of various FMU configurations arranged and attached to create a floating community, according to an embodiment of the present invention.

FIG. 42 is a top plan view of FIG. 41 illustrating various FMU 19 configurations arranged and attached to create a floating community, according to an embodiment of the present invention. As shown, boat access is provided to the many perimeter edges and locations throughout the community.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A transportable structure kit for use in assembling floatable communities in a variety of configurations, comprising:
   a pair of floatable exterior container shells attachable to each other to form an enclosed transportable container in a transportation mode, the pair of exterior container shells separable as a top portion shell and a bottom portion shell, and at least one exterior side of the bottom portion shell bolted to a hinge plate connector; the at least one exterior side of the bottom portion shell detachably fastened to at least one floating platform by the hinge plate connector;
   a plurality of column members detachably mounted between the top portion shell and the bottom portion shell in at least four corners of each shell, securing the top portion shell apart from the bottom portion shell in an assembled mode;
   a plurality of panel sections detachably mounted between the bottom portion shell and the top portion shell in the assembled mode;
   wherein the plurality of column members and plurality of panel sections are configured for repetitive assembly and disassembly, and entirely storable within the enclosed transportable container in the transportation mode;
   at least one anchor assembly comprising an elastic rode, a first end of the elastic rode connected to a helix anchor assembly and a second end of the elastic rode connected to a bracket; the bracket attached to the exterior side of the bottom portion shell and the helix anchor assembly anchors into earth, wherein the elastic rode contracts or stretches along with a change in water level.

2. The transportable structure kit of claim 1, wherein a set of the plurality of panel sections are detachably mounted horizontally across a top surface of the bottom portion shell as a floor in the assembled mode.

3. The transportable structure kit of claim 2, further comprising a plurality of floor beams detachably mounted on the bottom portion shell beneath the floor, and wherein the plurality of floor beams are entirely storable within the enclosed transportable container in the transportation mode.

4. The transportable structure kit of claim 1, wherein a set of the plurality of panel sections are removably mounted vertically as a wall between the pair of exterior container shells in the assembled mode.

5. The transportable structure kit of claim 1, wherein each exterior container shell is configured to have a mounting track along an outer perimeter of the shell at or near a location where the pair of exterior container shells meet when attached in the transportation mode.

6. The transportable structure kit of claim 5, wherein a set of the plurality of panel sections are removably mounted as a wall to the mounting track of each of the pair of exterior container shells in the assembled mode.

7. The transportable structure kit of claim 1, further comprising a plurality of column insert sleeves, one sleeve located near at least each corner of the bottom portion shell, configured to securely receive one of the plurality of column members into the bottom portion shell.

8. The transportable structure kit of claim 1, further comprising pre-manufactured components of the kit including: at least one photovoltaic system, finishing material, a track system, hardware, insert sleeves, a battery, a water purification system, floor support members, lighting, ventilation, and an anchoring system; wherein the components are entirely storable within the enclosed transportable container in the transportation mode.

9. The transportable structure kit of claim 1, wherein the at least one floating platform is an interlocking floating pontoon module.

10. The transportable structure kit of claim 1, wherein the at least one floating platform extending to connect to a plurality of floating platforms to form a walkway.

11. The transportable structure kit of claim 10, wherein an upper surface of the top portion shell is configured to removably attach to a canopy, and wherein the canopy is removably attachable to the plurality of floating platforms by a set of support members.

12. The transportable structure kit of claim 1, wherein the kit in an assembled form floats.

13. A transportable structure kit for use in assembling floatable communities in a variety of configurations, comprising:
   a roof section and a hull section attachable to each other to form an enclosed container in a packed form, each hull section having at least four sides wherein at least one side is bolted to a hinge plate connector; the at least one side of the hull section removably connected to at least one independently floatable platform by the hinge plate connector;
   a plurality of column members detachably mountable between the roof section and the hull section, forming a height of livable space between the roof section and the hull section in an assembled form;
   a plurality of panel sections detachably mountable between the roof section and the hull section; and
   a photovoltaic system coupled to the roof section;
   wherein the column members, panel sections and photovoltaic system are storable inside the enclosed container formed by the roof section and the hull section during the packed form;
   at least one anchor assembly comprising an elastic rode, a first end of the elastic rode connected to a helix anchor assembly and a second end of the elastic rode connected to a bracket; the bracket attached to the exterior side of the hull section and the helix anchor assembly anchors into earth, wherein the elastic rode contracts or stretches along with a change in water level.

14. The transportable structure kit according to claim 13, sized to fit inside a freight container when in the packed form.

15. A plurality of transportable structure kits according to claim 13, each transportable structure kit in the assembled form attached to one or more interlocking floating platforms and attached to another transportable structure kit in the assembled form via the one or more interlocking floating platforms.

* * * * *